US011839325B2

(12) United States Patent
Smith et al.

(10) Patent No.: US 11,839,325 B2
(45) Date of Patent: *Dec. 12, 2023

(54) BEVERAGE PREPARATION MACHINE AND GASKET ARRANGEMENT

(71) Applicant: Keurig Green Mountain, Inc., Burlington, MA (US)

(72) Inventors: Geoffrey Y. Smith, Melrose, MA (US); Blair Mikkelsen, Chelmsford, MA (US); Steven Mackey, Dedham, MA (US); Joseph George Fucci, Amherst, NH (US); Roger Johnson, Burlington, MA (US)

(73) Assignee: Keurig Green Mountain, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,676

(22) Filed: Jul. 1, 2022

(65) Prior Publication Data

US 2022/0330741 A1 Oct. 20, 2022

Related U.S. Application Data

(63) Continuation of application No. 17/666,282, filed on Feb. 7, 2022, now Pat. No. 11,395,558, which is a
(Continued)

(51) Int. Cl.
*A47J 31/44* (2006.01)
*A47J 31/02* (2006.01)
(Continued)

(52) U.S. Cl.
CPC ........... *A47J 31/4403* (2013.01); *A47J 31/02* (2013.01); *A47J 31/3695* (2013.01);
(Continued)

(58) Field of Classification Search
CPC .. A47J 31/4403; A47J 31/461; A47J 31/5255; A47J 31/469; A47J 31/02; A47J 31/3695; A47J 31/407; A47J 31/4492
(Continued)

(56) References Cited

U.S. PATENT DOCUMENTS 6,607,762 B2 8/2003 Lazaris et al.
6,644,173 B2 11/2003 Lazaris et al.
(Continued)

FOREIGN PATENT DOCUMENTS

CN 203252455 U 10/2013
CN 205758229 U 12/2016
(Continued)

OTHER PUBLICATIONS

Invitation to Pay Additional Fees dated Feb. 25, 2020 in connection with International Application No. PCT/US2019/058718 (10 pages).
(Continued)

*Primary Examiner* — Phuong T Nguyen
(74) *Attorney, Agent, or Firm* — Pizarro Allen PC

(57) ABSTRACT

A beverage preparation machine having an inlet arrangement and a gasket arrangement is provided, where the inlet arrangement is configured with a plurality of inlet ports to deliver liquid to a beverage cartridge. The gasket arrangement may include a single unitary shape with a plurality of openings for receiving the plurality of inlet ports. The gasket arrangement may include one or more inner ribs disposed about each of the plurality of openings. A perimeter rib may extend along a perimeter of the gasket arrangement.

4 Claims, 21 Drawing Sheets

Related U.S. Application Data continuation of application No. 17/450,654, filed on Oct. 12, 2021, which is a continuation of application No. 17/229,577, filed on Apr. 13, 2021, which is a continuation-in-part of application No. PCT/US2019/058718, filed on Oct. 30, 2019.

(60) Provisional application No. 62/752,894, filed on Oct. 30, 2018.

(51) Int. Cl.
| | | |
|---|---|---|
| *A47J 31/46* | (2006.01) | |
| *A47J 31/52* | (2006.01) | |
| *A47J 31/36* | (2006.01) | |
| *A47J 31/40* | (2006.01) | |

(52) U.S. Cl.
CPC .......... *A47J 31/407* (2013.01); *A47J 31/4492* (2013.01); *A47J 31/461* (2018.08); *A47J 31/469* (2018.08); *A47J 31/5255* (2018.08)

(58) Field of Classification Search
USPC .......................... 99/280, 290, 291, 293, 295
See application file for complete search history.

(56) References Cited

U.S. PATENT DOCUMENTS

| | | | |
|---|---|---|---|
| 8,904,922 B2 | 12/2014 | Pagano | |
| 8,999,421 B2 | 4/2015 | Clark | |
| 9,084,509 B2 | 7/2015 | Tanner et al. | |
| 9,119,504 B2 | 9/2015 | Bugnano et al. | |
| 9,867,493 B2 * | 1/2018 | Novak | B01F 35/713 |
| 9,974,409 B2 | 5/2018 | Cabilli et al. | |
| 10,011,421 B2 | 7/2018 | Bartoli et al. | |
| 10,188,236 B2 | 1/2019 | Stefanoni | |
| 10,470,605 B2 | 11/2019 | Ergican et al. | |
| 10,533,790 B2 | 1/2020 | Sakthivel et al. | |
| D895,355 S | 9/2020 | Mikkelsen et al. | |
| D898,169 S | 10/2020 | Cassano et al. | |
| D908,426 S | 1/2021 | Mikkelsen et al. | |
| D908,850 S | 1/2021 | Cassano et al. | |
| D922,548 S | 6/2021 | Cassano et al. | |
| 2002/0144604 A1 | 10/2002 | Winkler et al. | |
| 2006/0225575 A1 | 10/2006 | Denisart et al. | |
| 2007/0213631 A1 | 9/2007 | Kondo et al. | |
| 2013/0263423 A1 | 10/2013 | Clark | |
| 2014/0072676 A1 | 3/2014 | Moutty | |
| 2014/0284333 A1 | 9/2014 | Poon et al. | |
| 2015/0008651 A1 | 1/2015 | Koyama | |
| 2015/0335872 A1 | 11/2015 | Yang et al. | |
| 2016/0229677 A1 | 8/2016 | Girault et al. | |
| 2017/0258265 A1* | 9/2017 | Trombetta | A47J 31/46 |
| 2017/0303733 A1 | 10/2017 | Balkau | |
| 2020/0114136 A1 | 4/2020 | Nangou | |
| 2021/0289982 A1 | 9/2021 | Smith | |
| 2022/0031113 A1 | 2/2022 | Smith | |
| 2022/0160163 A1 | 5/2022 | Smith | |

FOREIGN PATENT DOCUMENTS

| | | |
|---|---|---|
| CN | 107231791 A | 10/2017 |
| CN | 108577433 A | 9/2018 |
| WO | 2002074144 A2 | 9/2002 |
| WO | 2018156361 A1 | 8/2018 |
| WO | 2020092472 A2 | 5/2020 |

OTHER PUBLICATIONS

International Search Report and Written Opinion dated Jun. 23, 2020 in connection with International Application No. PCT/US2019/058718 (16 pages).

International Preliminary Report on Patentability dated May 14, 2021 in connection with International Application No. 3CT/US2019/058718 (10 pages).

* cited by examiner

BEVERAGE PREPARATION MACHINE AND GASKET ARRANGEMENT

CROSS-REFERENCE TO RELATED APPLICATIONS

This application is a continuation of U.S. patent application Ser. No. 17/666,282, filed Feb. 7, 2022, which is a continuation of U.S. patent application Ser. No. 17/450,654, filed Oct. 12, 2021, which is a continuation of U.S. patent application Ser. No. 17/229,577, filed Apr. 13, 2021, which is a continuation-in-part of International Application No. PCT/US2019/058718, filed Oct. 30, 2019, which claims the benefit of priority of U.S. Provisional Application No. 62/752,894, filed Oct. 30, 2018. The full disclosures of the aforementioned applications are incorporated herein by reference.

BACKGROUND

1. Field

This invention relates to beverage forming systems, such as coffee brewers that use a liquid to form a coffee beverage.

2. Related Art

Beverage forming systems that use a liquid, such as water, to form a beverage are well known. For example, U.S. Pat. No. 8,361,527 discloses a beverage forming system that uses a beverage cartridge containing a beverage material to make a beverage by introducing liquid into the cartridge. Liquid provided to the cartridge may be heated in a tank prior to delivery to the cartridge.

SUMMARY OF INVENTION

Aspects of the invention relate to a beverage forming apparatus including a brew chamber arranged to hold a beverage ingredient. For example, the brew chamber may include a cartridge holder arranged to hold a cartridge containing the beverage ingredient such that liquid is deliverable via a liquid inlet to the cartridge for combining with the beverage ingredient to form a beverage, and beverage may exit the brew chamber via a liquid outlet. The liquid inlet may include an inlet port arrangement having a central inlet port and a plurality of peripheral inlet ports arranged around the central inlet port. In some embodiments, the beverage forming apparatus may have the ability to implement different dispensing operations in which liquid is dispensed through selectable subsets of the inlet ports. For example, in a first dispensing operation, dispensing occurs from the central inlet port only, and not the plurality of peripheral inlet ports. In a second dispensing operation, dispensing occurs from at least one of the plurality of peripheral inlet ports only, but not the central inlet port. In a third dispensing operation, dispensing occurs from all of the inlet ports. In some embodiments, selective dispensing from inlet ports may be performed by controlling individual valves associated with each inlet port.

In some embodiments, a beverage forming system includes a brew chamber configured to hold a capsule containing a beverage ingredient. The brew chamber includes a liquid inlet to provide liquid for combining with the beverage ingredient to form a beverage and a beverage outlet to allow beverage to exit the brew chamber. The liquid inlet comprises a plurality of inlet ports. The beverage forming system includes a gasket arrangement with a plurality of openings, where each of the plurality of inlet ports are received within an associated opening. The gasket arrangement includes a bottom side configured to seal against a lid of a capsule held in the brew chamber. The bottom side has a flat central portion and a peripheral portion that is oriented at an angle relative to the flat central portion.

In some embodiments, a beverage forming system includes a brew chamber arranged to hold a beverage ingredient, a liquid inlet to provide liquid for combining with the beverage ingredient to form a beverage and a beverage outlet to allow beverage to exit the brew chamber. The liquid inlet includes a central inlet port and a plurality of peripheral inlet ports arranged around the central inlet port. The control circuit is configured to control dispensing from the liquid inlet with at least two out of the following three dispensing operations:
  (a) a first operation comprising dispensing from the central inlet port only,
  (b) a second operation comprising dispensing from at least one of the plurality of peripheral inlet ports only, and
  (c) a third operation comprising dispensing from the central inlet port and at least one of the plurality of peripheral inlet ports.

In some embodiments, a method of forming a beverage includes providing a beverage ingredient in a chamber of a beverage forming apparatus and dispensing liquid into the chamber to introduce the liquid to the beverage ingredient to form a beverage by performing at least one of the following dispensing operations:
  (a) a first dispensing operation comprising dispensing only from a central port of a plurality of ports, the plurality of ports including a plurality of peripheral ports arranged around the central port; and
  (b) a second dispensing operation dispensing only from at least one of the peripheral ports.

In one embodiment, a beverage forming system includes a brew chamber arranged to hold a beverage ingredient, e.g., the brew chamber may include a cartridge holder to receive a capsule in a cup-shaped receptacle and a lid that is movable to enclose the capsule. The brew chamber may include a liquid inlet to provide liquid for combining with the beverage ingredient to form a beverage and a beverage outlet to allow beverage to exit the brew chamber. The liquid inlet may include a central inlet port and a plurality of peripheral inlet ports arranged around the central inlet port. The plurality of peripheral inlet ports may include four peripheral inlet ports positioned at a respective vertex of an isosceles trapezoid and the central inlet port being positioned within the isosceles trapezoid. The inlet ports may be movable to pierce a capsule, e.g., mounted to a lid of the brew chamber that is movable relative to a capsule held in a cartridge holder. A liquid supply may be configured to provide liquid to the liquid inlet, e.g., may include a water reservoir, a pump to move liquid, conduits to conduct flow of liquid, one or more valves to control flow in conduits, etc. A liquid conditioner may be configured to heat and/or cool the liquid provided to the liquid inlet, e.g., may include a heater tank to heat water. A control circuit may be arranged to control operation of the liquid supply and the liquid condition to provide liquid to the liquid inlet, e.g., so that all of the inlet ports dispense liquid simultaneously and/or so that one or more of the ports are employed in any suitable set to deliver liquid.

In some embodiments, a beverage forming system may include: a brew chamber configured to hold a beverage cartridge containing a beverage ingredient, the brew chamber including a liquid inlet configured to provide liquid for combining with the beverage ingredient to form a beverage and a beverage outlet to allow beverage to exit the brew chamber, the liquid inlet including a plurality of inlet ports; and a gasket arrangement including a single unitary shape with a plurality of openings for receiving the plurality of inlet ports; wherein each of the plurality of inlet ports is received within one of the plurality of openings; and wherein the gasket arrangement includes: one or more inner ribs disposed about each of the plurality of openings; and a perimeter rib that extends along a perimeter of the gasket arrangement such that the perimeter rib surrounds each of the plurality of openings.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
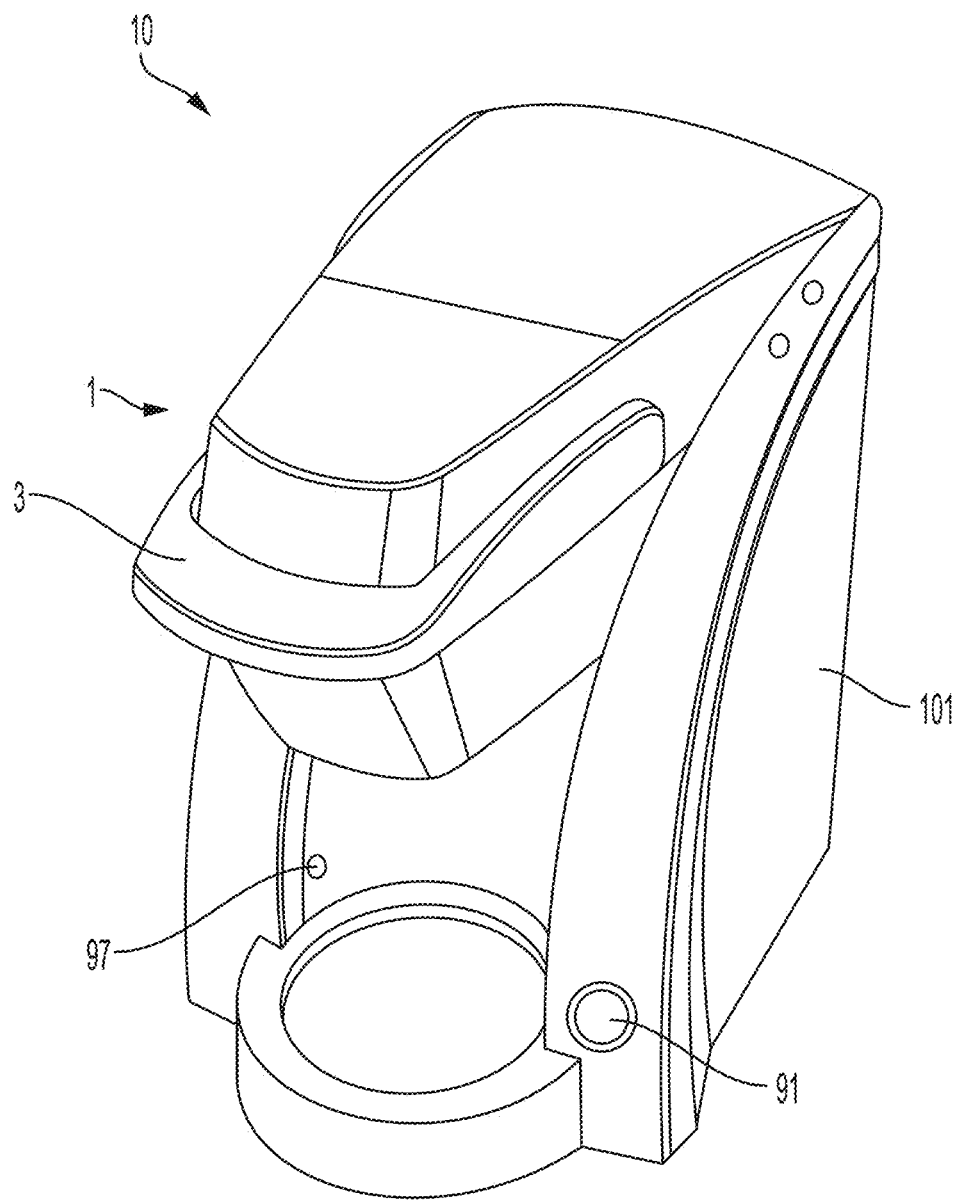
FIG. 1 is a perspective view of a beverage formation device in an illustrative embodiment.
Figure 2:
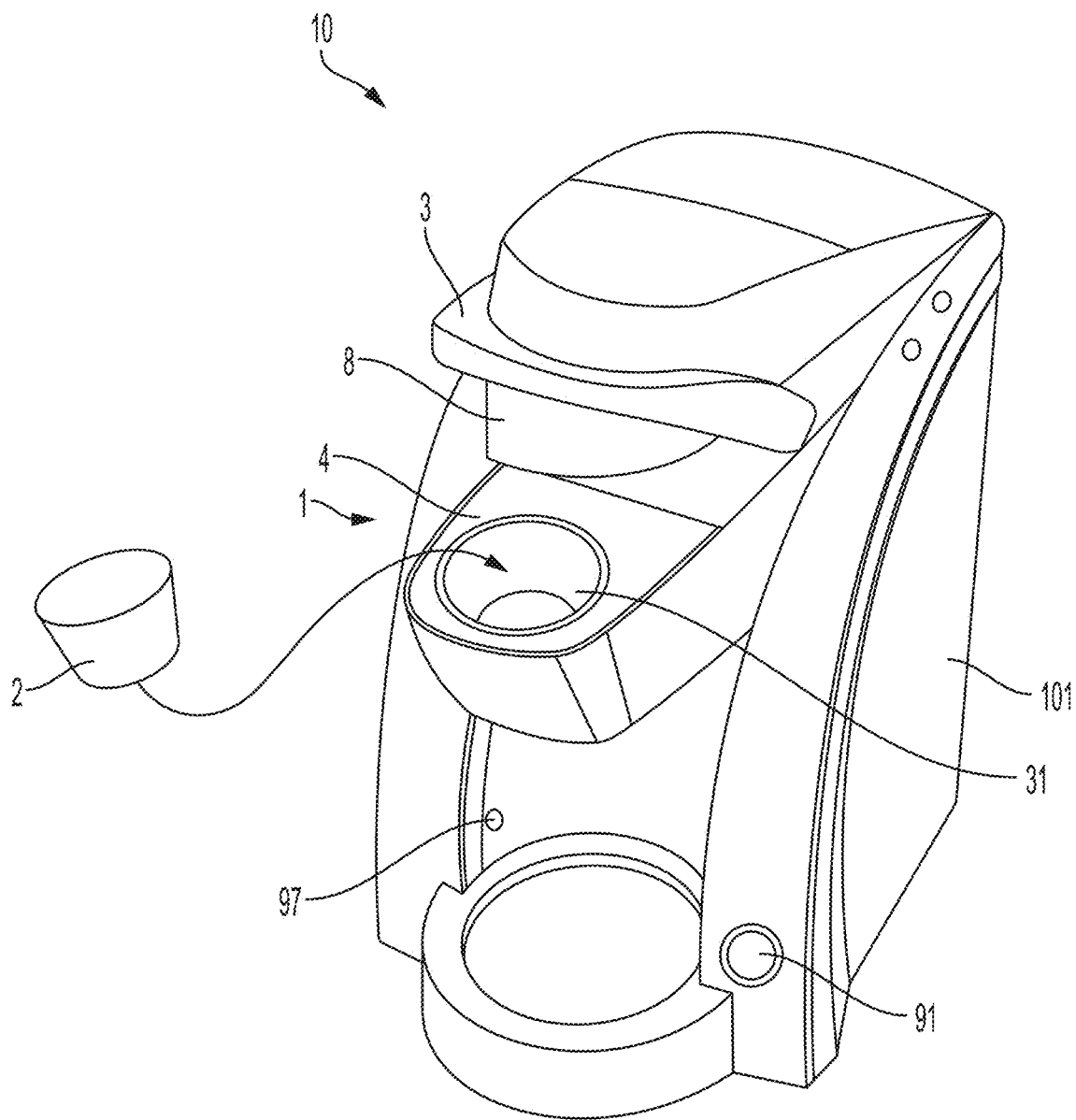
FIG. 2 is a perspective view of the beverage formation device of FIG. 1 with a brew chamber in an open position.

FIGS. 1 and 2 show a perspective view of a beverage forming apparatus 10 in an illustrative embodiment that incorporates aspects of the invention. The beverage forming apparatus 10 may be used to form any suitable beverage, such as tea, coffee, other infusion-type beverages, beverages formed from a liquid or powdered concentrate, soups, juices, sodas or other beverages made from dried materials.

As is known in the art, a cartridge 2 may be provided to the apparatus 10 and used to form a beverage that is deposited into a container, such as a user's cup. The cartridge 2 may be manually or automatically placed in a brew chamber 1 of the beverage forming apparatus 10. The brew chamber may comprise a cartridge holder 4 and a cover or lid 8. The cartridge holder 4 may include an opening 31 to receive the cartridge.

In some embodiments, the cartridge holder 4 may be exposed to receive the cartridge 2 at the opening 31 of the cartridge holder 4 of the brew chamber 1 when the user operates a handle 3 or other actuator to open the brew chamber 1. In this embodiment, movement of the handle 3 or other actuator may cause the cover 8 of the brew chamber 1 to move relative to the cartridge holder 4 (or the cover 8 and cartridge holder 4 to otherwise move relative to each other, e.g., by having the cartridge holder 4 move) to expose the cartridge holder 4 for reception of a cartridge 2. In some embodiments, the beverage forming apparatus 10 may operate, for example, as shown in U.S. Pat. No. 7,165,488, which is hereby incorporated by reference. That is, lifting the handle 3 may cause a brew chamber lid to be raised so that a cartridge holder may tilt forward to receive a beverage cartridge.

Of course, it should be understood that the brew chamber 1 may be opened in other ways, such as by push button actuation of a motor-driven mechanism, manual opening of a drawer that slides linearly outwardly to receive a cartridge, and so on.

With the cartridge 2 placed in the brew chamber 1, the actuator 3 may be operated to close the brew chamber 1, e.g., so that the cover 8 moves to cooperate with the cartridge holder 4 to at least partially enclose the cartridge 2 so water or other precursor liquid or substance can be delivered from an inlet port into the cartridge 2 to form a beverage. For example, with the cartridge 2 held in the brew chamber 1, the cartridge 2 may be pierced to form inlet and outlet openings through which water or other precursor liquid or substance enters the cartridge 2 and beverage that exits the cartridge 2, respectively. U.S. Pat. No. 8,361,527 describes a cartridge and a system for introducing liquid into the cartridge that may be used in embodiments of this invention, and is hereby incorporated by reference in its entirety.

Of course, aspects of the invention may be employed with any suitably arranged apparatus, including drip-type coffee brewers, carbonated beverage machines, and others arranged to form a beverage regardless of how the beverage is formed. For example, a cartridge 2 may include any suitable materials to form a beverage, such as a carbon dioxide source used to carbonate water, a beverage mix, etc. Alternately, beverage ingredients need not be contained in a cartridge 2, but rather may be provided to the brew chamber 1 in a loose or uncontained form. In such embodiments, the brew chamber 1 may include a disposable or reusable filter to hold the beverage ingredient so that water or other liquid can be introduced to the brew chamber via an inlet and combined with the beverage ingredient to form a beverage that flows through the filter to an outlet of the brew chamber 1.

This illustrative embodiment includes a housing 101 that encloses various parts of the beverage forming apparatus 10 and supports several external features, such as a power button 91, a cup sensor 97 (e.g., a photosensor) and/or other optional features.

If used with the apparatus 10, cartridges may be arranged in different ways, and their configuration may depend at least in part on the nature of how a beverage ingredient in the cartridge is used to form a beverage. As will be understood, the cartridge 2 may contain any suitable beverage medium or ingredient, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutraceuticals, etc.), and/or other beverage-making material (such as powdered milk or other creamers, sweeteners, thickeners, flavorings, and so on). In some embodiments, a cartridge 2 may include a container that includes an interior space having a first chamber and a second chamber that are separated by a filter. The container may have a frustoconical cup shape with a sidewall and a top opening covered by a lid, although other arrangements are possible. Also, the container need not necessarily have a defined shape, as is the case with some beverage sachets and pods.

When using a cartridge 2 to form a beverage, the lid and/or the container may be pierced to introduce liquid into the cartridge and receive beverage from the cartridge. (As used herein, "beverage" refers to a liquid substance intended for drinking that is formed when a liquid interacts with a beverage medium or ingredient. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.) The cartridge may be pierced in the brew chamber 1 by an inlet arrangement or otherwise opened for access into the cartridge so that water or other liquid may be injected into the cartridge 2. The cartridge may be pierced by an outlet port to form one or more outlet openings, or one or more outlet openings may otherwise be formed in the cartridge to allow beverage to exit the cartridge.

In some embodiments, the inlet arrangement comprises multiple inlet ports, including a central inlet port surrounded by a plurality of peripheral inlet ports. In some embodiments, each inlet port includes a piercing element, such as a needle, configured to pierce a container holding a beverage ingredient (e.g. a cartridge). The piercing elements may be hollow to permit flow of a fluid through the piercing element.

In accordance with an aspect of the invention, the beverage forming apparatus may have the ability to implement different dispensing operations in which dispensing occurs through selectable subsets of the inlet ports. For example, in a first dispensing operation, dispensing occurs from the central inlet port only, and not the plurality of peripheral inlet ports. In a second dispensing operation, dispensing occurs from at least one of the plurality of peripheral inlet ports only, but not the central inlet port. In a third dispensing operation, dispensing occurs from all of the inlet ports. In some embodiments, selective dispensing from inlet ports may be performed by controlling individual valves associated with each inlet port.

Figure 3:
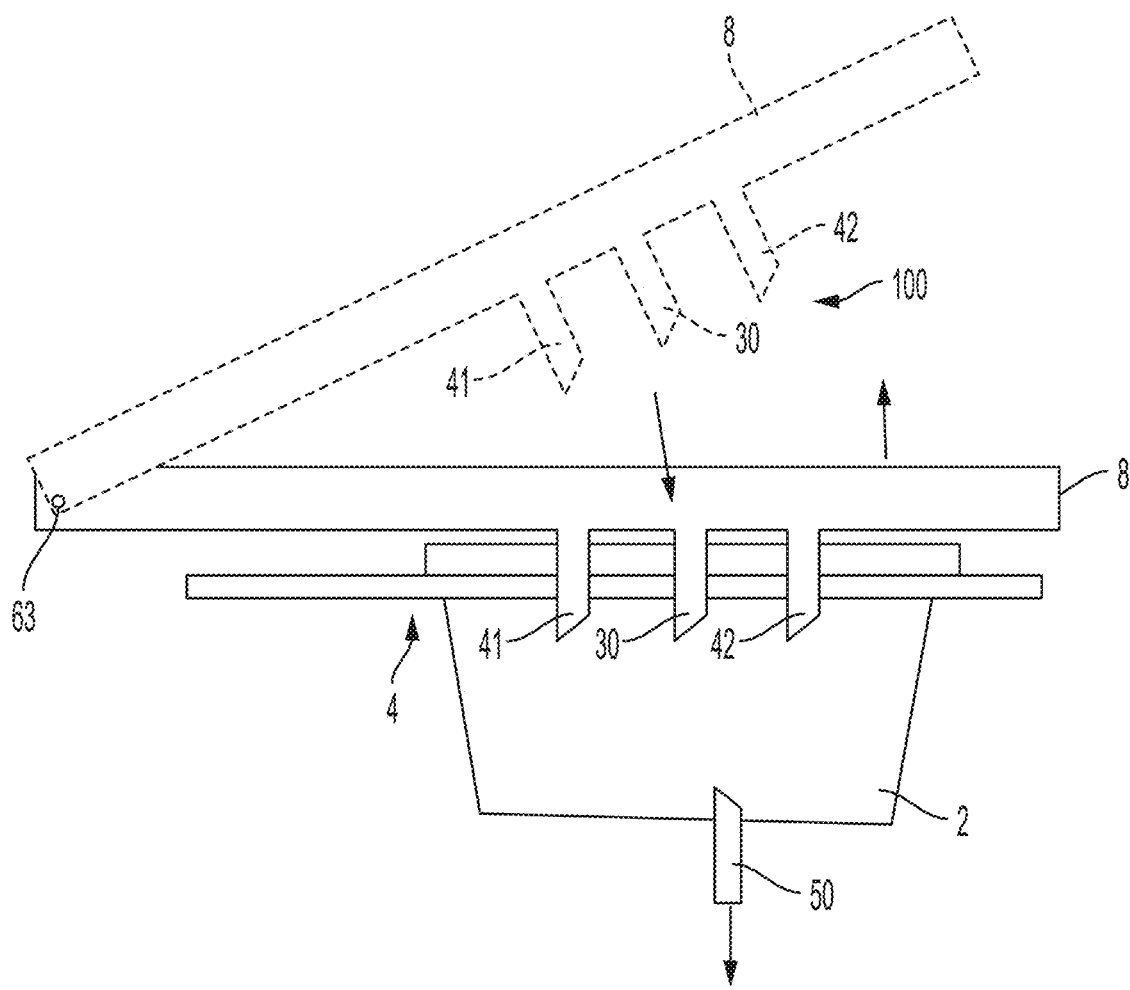
FIG. 3 is a schematic side view of a brew chamber and inlet port assembly in an illustrative embodiment.

FIG. 3 shows a schematic side view of an inlet and outlet port configuration according to one illustrative embodiment. As can be seen in FIG. 3, the cover 8 of the beverage forming apparatus 10 may include a central inlet port 30 and peripheral inlet ports 41 and 42. The brew chamber may also include an outlet port 50. The cover 8 may be pivotal about a cover pivot 63 between an open position (shown in dashed line) and a closed position (shown in solid line). In this embodiment, the inlet ports 30, 41, and 42 and the outlet port 50 comprise piercing elements (e.g., needles) to pierce the cartridge 2 and form an opening, but piercing elements for either the inlet ports or the outlet port is not required. Instead, the cartridge 2 may have pre-formed inlet/outlet openings, or the openings may be formed by pressure applied to the outside or inside of the cartridge. For example, water pressure and/or contact pressure from the port may be applied to the exterior of the cartridge 2 to form inlet openings, and beverage pressure inside the cartridge may form an outlet opening in the cartridge, e.g., a septum, burstable seal or other structure may open in response to pressure.

Control of dispensing from an inlet port may be achieved in various ways. In some embodiments, dispensing from an inlet port is achieved by opening a valve positioned in the inlet port flow path—which includes the delivery line upstream of the inlet port, within the inlet port itself, or at an outlet end of the inlet port. In some embodiments, dispensing from an inlet port is achieved by activating a pump to pump a substance toward the inlet port. In some embodiments, a subset of inlet ports may receive a substance from a source different than that of another subset of inlet ports. As such, a beverage forming apparatus may have more than one delivery pump, e.g., one for delivering a first substance from a first source and one for delivering a second substance from a second, different source. In this manner, in some embodiments, dispensing from an inlet port is achieved by activating the pump associated with the inlet port. In other embodiments, a combination of pump activation and valve opening is used to achieve dispensing from one or more inlet ports.

In some embodiments, certain subsets of inlet ports are grouped together for dispensing. In one illustrative example, an inlet arrangement having five total inlet ports has a first subset made up of the first inlet port, and a second subset made up of the remaining four other inlet ports. The beverage machine is able to selectively dispense from the first subset of inlet ports independent from the second subset and vice versa, and is also able to dispense from both at once. In some embodiments, the beverage machine is able to selectively dispense from each inlet port individually and independently of one another.

Having the ability to selectively dispense from subsets of inlet ports may permit adjustability of various characteristics of the formed beverage. Examples of adjustable characteristics include, but are not limited to: beverage strength, beverage volume and carbonation level.

With regard to beverage strength, in some embodiments, dispensing from more inlet ports may increase flavor extraction and result in a stronger beverage (e.g., in the case of coffee, increase coffee extraction and brew a stronger coffee). Dispensing from fewer inlet ports may decrease flavor extraction and result in a weaker beverage (e.g., in the case of coffee, decrease coffee extraction and brew a weaker coffee). In some embodiments, selection of a certain beverage strength may cause a specific subset of inlet ports to be used. For example, to create a stronger beverage, a first subset of inlet ports may be used, and to create a weaker beverage, a second subset of inlet ports may be used, where the first subset of inlet ports may include more or different inlet ports than the second subset of inlet ports.

With regard to beverage volume, in some embodiments, dispensing from more inlet ports may increase beverage volume, and dispensing from fewer inlet ports may decrease beverage volume. In some embodiments, selection of a certain beverage volume may cause a specific subset of inlet ports to be used. For example, to create a larger beverage volume, a first subset of inlet ports may be used, and to create a smaller beverage volume, a second subset of inlet ports may be used, where the first subset of inlet ports may include more inlet ports than the second subset of inlet ports.

In some embodiments, a subset of the inlet ports may dispense a different type of liquid or other substance than that of another subset of the inlet ports. For example, one subset of the inlet ports may dispense carbonated liquid while another subset of the inlet ports may dispense non-carbonated liquid. A control circuit may selectively dispense from different numbers of the inlet ports to control the relative amounts of carbonated liquid and non-carbonated liquid delivered in order to adjust the level of carbonation in the resulting beverage. In some embodiments, selection of a certain carbonation level may cause a specific subset of inlet ports to be used. For example, to create a more carbonated beverage, a first subset of inlet ports may be used, and to create a less carbonated beverage, a second subset of inlet ports may be used. The first subset of inlet ports may include more or different inlet ports that deliver carbonated liquid than the second subset of inlet ports.

In some embodiments, certain beverage types may be associated with use with a specific subset of inlet ports. For example, a first subset of inlet ports may be more effective for formation of infused beverages, such as coffees or teas, while a second subset of inlet ports may be more effective for formation of beverages created from soluble ingredients, such as hot chocolate or juices. In some embodiments, one or more of the first subset of inlet ports may be in a different position than the second subset of inlet ports. The first subset of inlet ports may be better positioned for promoting infusion, while the second subset of inlet ports may be better positioned for promoting dissolving the ingredients. In some embodiments, the first subset of inlet ports may have a different number of inlet ports than the second subset of inlet ports. There may, in some embodiments, be an overlap of inlet ports between the first and second subsets of inlet ports. In some embodiments, within the category of soluble beverages, different types of beverages may be associated with different subsets of inlet ports.

As another example, a first subset of inlet ports may be more effective for formation of coffee beverages, while a second subset of inlet ports may be more effective for formation of tea beverages. One or more of the inlet ports of the first subset of inlet ports may be in a different position than the second subset of inlet ports, and/or may have a different number of inlet ports than the second subset of inlet ports.

In some embodiments, combinations of beverage characteristics may determine which subsets of inlet ports are used to form a beverage. In some embodiments, beverage type and strength may together determine use of different inlet port subsets. For example, a strong coffee beverage may require use of all inlet ports, while a strong tea may require use of less inlet ports, and a weak tea may require use of even less (or more) inlet ports.

In another example, one subset of the inlet ports may dispense liquid while another subset of the inlet ports may dispense steam. A control circuit may selectively dispense from different numbers of the inlet ports to control the relative amounts of liquid and steam delivered to the brew chamber. In some embodiments, certain beverage settings and/or certain beverage types may be associated with specific subsets of inlet ports to be used. For example, when forming beverages that require more steam, more steam-dispensing inlet ports may be used, while when forming beverages that require less steam, less steam-dispensing inlet ports may be used.

In some embodiments, a subset of the inlet ports may dispense a liquid at a different flow rate than that of another subset of the inlet ports. For example, a central inlet port may dispense liquid at a first flow rate, and peripheral inlet ports arranged around the central inlet port may dispense liquid at a second, different flow rate. In some cases, specific flow rate delivery profiles may aid in mixing of ingredients within the cartridge and/or alter beverage characteristics such as brew strength.

In some embodiments, more than one dispensing operation may be used during a single brew cycle. In other words, more than one dispensing operation may be used to make a single beverage. For example, in one embodiment, a beverage forming apparatus having an inlet arrangement with a central inlet port and a plurality of peripheral inlet ports arranged around the central inlet port is operable in three different dispensing operations: (a) a first operation comprising dispensing from the central inlet port only, (b) a second operation comprising dispensing from at least one of the plurality of peripheral inlet ports only, and (c) a third operation comprising dispensing from the central inlet port and at least one of the plurality of peripheral inlet ports. In some embodiments, in the process of forming a single beverage, the beverage forming apparatus performs only one of the first, second, or third operations. However, in other embodiments, the beverage forming apparatus may, in the process of forming a single beverage, perform any combination of the operations. For example, in forming a single beverage, the beverage forming apparatus may perform the first operation, and then perform the second operation, or vice versa. Or, in forming a single beverage, the beverage forming apparatus may first perform the first operation, and then perform the third operation, or vice versa. Or, in forming a single beverage, the beverage forming apparatus may perform the second operation, and then perform the third operation, or vice versa. Or, in forming a single beverage, the beverage forming apparatus may perform all three operations in any order.

Figure 4:
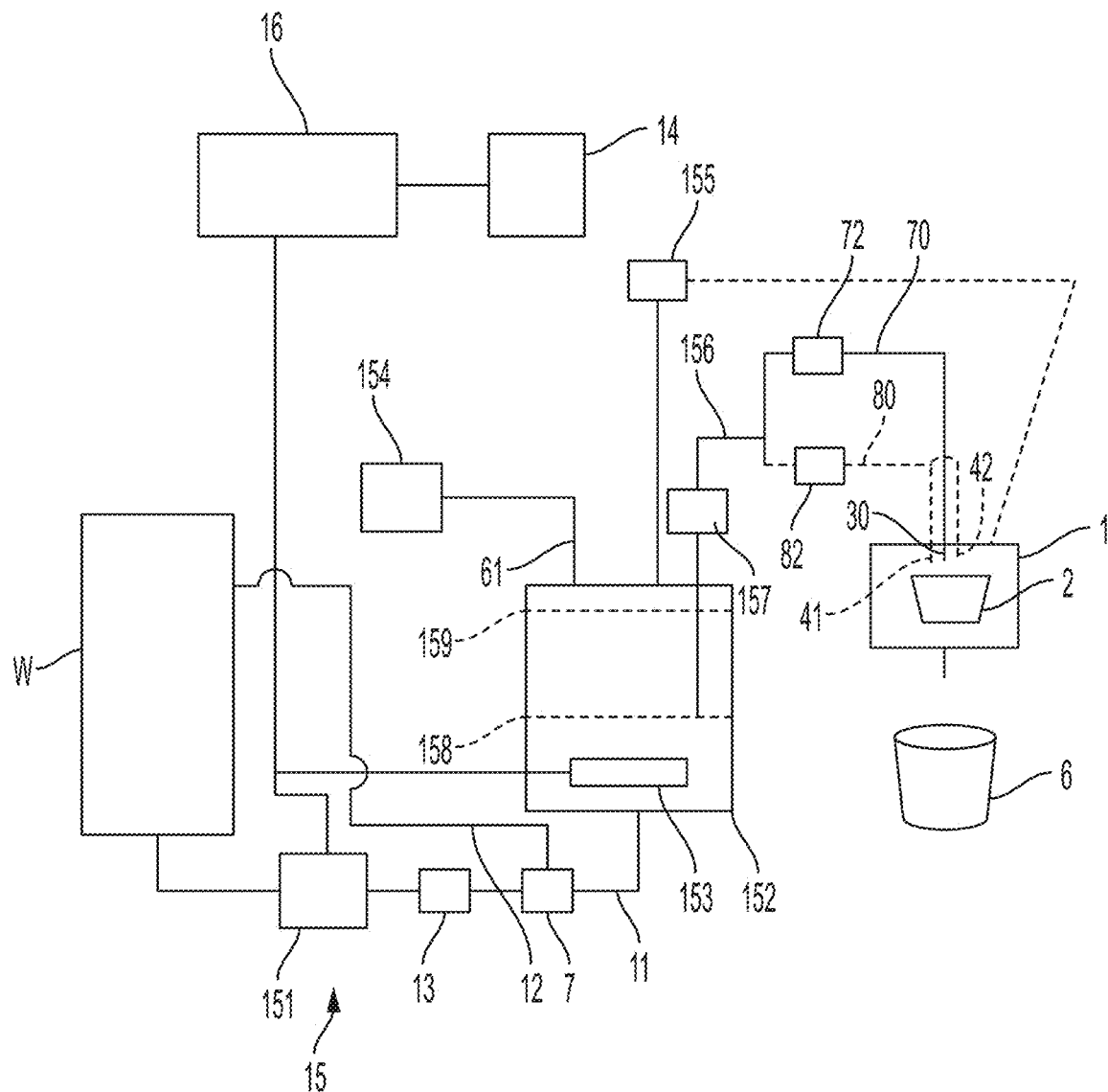
FIG. 4 is a schematic diagram of components of a beverage forming apparatus in an illustrative embodiment.

FIG. 4 shows a schematic block diagram of various components that may be included in a beverage forming apparatus 10 in one illustrative embodiment. Those of skill in the art will appreciate that a beverage forming apparatus 10 may be configured in a variety of different ways, and thus aspects of the invention should not be narrowly interpreted as relating only to one type of beverage forming apparatus. In this embodiment, water or other precursor liquid may be provided by a liquid supply 15 to mix with a beverage ingredient at the brew chamber 1. The liquid supply 15 in this embodiment controls the volume of liquid provided to the brew chamber 1 by filling a heater tank 152 to a liquid dispense level 159 and then pressurizing the tank 152 by way of an air pump 154 so that liquid in the heater tank 152 is forced out of the delivery line 156 to inlet ports 30, 41 and 42 and into the brew chamber 1. A check valve 157 may be provided in the delivery line 156 to allow flow from the heater tank 152 to the brew chamber 1, but resist flow from the brew chamber 1 to the heater tank 152.

In the embodiment shown in FIG. 4, the delivery line 156 divides into two separate and distinct delivery lines: a central delivery line 70 that delivers liquid to the central inlet port 30, and a peripheral delivery line 80 that delivers liquid to the peripheral inlet ports 41 and 42. Each delivery line may have its own designated valve that may be independently controllable. As shown in FIG. 4, a valve 72 may be provided in the central delivery line 70, and a valve 82 may be provided in the peripheral delivery line 80. The valves 72, 82 may be controllable by a control circuit 16 to be in an open state to permit fluid communication or in a closed state to prohibit fluid communication. Furthermore, the valves may be independently controllable from one another. In other words, the valves may be controlled to be in different states from one another at the same time. Said another way, the valves and the control circuit are configured such that, changing the state of one valve does not affect the state of the other valve. For example, the control circuit 16 may control valve 72 to be open while controlling valve 82 to be closed. Or, the control circuit 16 may control valve 72 to be closed while controlling valve 82 to be open. The control circuit 16 may control valves 72, 82 to be open, either simultaneously or at different times. The control circuit 16 may also control valves 72, 82 to be closed.

In the embodiment shown in FIG. 4, a single valve 82 is used to control dispensing from the peripheral inlet ports 41, 42. In other embodiments, however, each peripheral inlet port may have its own designated valve such that delivery through the peripheral inlet ports may be independently controlled both relative to the central inlet port and to one another. For example, if an inlet port arrangement has four peripheral inlet ports, each peripheral inlet port may have its own associated valve to control dispensing of liquid from that inlet port. As a result, such an arrangement would have a total of five valves: one for the central inlet valve, and one for each of the four peripheral inlet ports. In other embodiments, the peripheral inlet ports may be paired off or otherwise grouped in different subsets, where each group has a designated valve. For example, if an inlet port arrangement has four peripheral inlet ports, two inlet ports may share a valve, and the other two inlet ports may share a second, different valve. As another example, three peripheral inlet ports may share a valve, while the last remaining inlet port may have its own valve.

The valves may be any type of valve that can be controlled to open and close. Examples of suitable valves include, but are not limited to: solenoid valves, pneumatically actuated valves, ball valves, butterfly valves, piston valves, diaphragm valves, pinch valves, shuttle valves, or any other suitable valve.

In some embodiments, one or more of the valves associated with control of inlet port dispensing are biased in the closed position. In other words, in the absence of an external force applied to the valve, the valve remains in the closed position. An external force must be applied to the valve to open the valve. Once the external force ceases, the valve automatically returns to the closed position. To open a valve, the control circuit may command application of a force to open the valve.

In some embodiments, one or more of the valves associated with control of inlet port dispensing can remain in either the open position or the closed position in the absence of an external force, and the control circuit causes the valve to toggle between the two positions. For example, when controlling dispensing to occur from an inlet port, the control circuit may command a valve associated with the inlet port to open. When dispensing from the inlet port is not desired, the control circuit may command the valve to close.

In some embodiments, the one or more of the valves associated with dispensing from inlet ports can be partially opened or closed.

In the embodiment of FIG. 4, the volume of liquid delivered to the brew chamber 1 is equal to the volume in the tank 152 between the liquid delivery level 159 and a post-delivery level 158 at a bottom of a conduit 156a in the tank 152 that extends downwardly from a top or upper portion of the tank to a location between the top and bottom of the tank 152. Note that while only one liquid dispense level 159 is shown, two or more liquid dispense levels 159 may be used to allow the system to deliver different volumes of liquid to the brew chamber 1. In other embodiments, the delivery line 156 may fluidly communicate with a bottom portion of the heater tank 152, e.g., so that the heater tank 152 is completely or substantially emptied.

In the embodiment of FIG. 4, the liquid supply 15 provides liquid to the tank 152 via a liquid pump 151 that is coupled to a source W. The source W may have any suitable arrangement, e.g., may provide liquid from a storage tank or reservoir like that shown schematically in FIG. 4, a mains water supply or other source. Thus, in some cases, the liquid provided to the tank 152 may vary in temperature by a wide degree depending on various factors, such as time of year, a temperature of a room in which the beverage forming apparatus 10 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the liquid pump 151 is controlled by the control circuit 16 to provide a desired volume of liquid to the tank 152. For example, if the tank 152 is empty or at the post-delivery level 158, the liquid pump 151 may be operated until a conductive probe or other liquid level sensor in the tank 152 provides a signal to the control circuit 16 that indicates when liquid arrives at the dispense level 159. In other embodiments, the liquid pump 151 may be arranged to provide a specified volume of liquid, e.g., the liquid pump 151 may be a piston pump, diaphragm pump, syringe pump or other type of pump that delivers a known volume of liquid for each pump stroke or other operation such the control circuit 16 can cause the liquid pump 151 to operate a specified number of cycles or a specified time to deliver a desired volume of liquid. Alternately, the system may include a flow meter or other device to detect liquid flow from the liquid pump 151 and thereby determine a volume of liquid delivered to the heater tank 152. This information may be used to control the liquid pump 151 to stop when a desired amount of liquid has been delivered.

Although in this embodiment a liquid level sensor is used including a conductive probe capable of contacting liquid in the tank 152 and providing a signal (e.g., a resistance change) indicative of liquid being present at respective dispense level 159 in the tank 152, a liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, a liquid level sensor is not necessarily limited to a conductive probe configuration. Moreover, the liquid level sensor may include two or more different types sensors to detect different levels in the tank. For example, a pressure sensor may be used to detect liquid at one dispense level (e.g., complete filling of the tank 152 may coincide with a sharp rise in pressure in the tank 152 that is detected by the pressure sensor), while a conductive probe may be used to detect liquid at another dispense level, such as dispense level 159.

Liquid in the tank 152 may be heated by way of a heating element 153 whose operation is controlled by the control circuit 16 using input from a temperature sensor or other suitable input. In some embodiments, a beverage brewing apparatus may include one or more in-line heaters that heat the liquid as the liquid moves toward the brew chamber. Of course, heating of the liquid is not necessary, and instead (or additionally) the apparatus 10 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the brew chamber 1 are referred to as a "liquid conditioner.")

In the embodiment of FIG. 4, the beverage forming apparatus 10 also includes a vent 155, which can be opened or closed to vent the heater tank 152. The vent 155 is linked to the actuator 3 and/or to the cover 8 such that when the actuator 3 and/or cover 8 are in the closed position (in which the brew chamber 1 is closed), the vent 155 is closed. However, if the actuator 3 and/or the cover 8 are moved from the closed position toward an open position, the vent 155 is opened to vent the heater tank 152. The vent 155 may provide a relatively large cross-sectional area for flow or otherwise allow a relatively large volume of fluid at a relatively large flow rate to pass through the vent 155 when open. This may help reduce pressure in heater tank 152 to ambient pressure and/or to a pressure at which liquid is not caused to flow from the heater tank 152 to the brew chamber 1. Thus, opening the vent 155 may help prevent flow to the brew chamber 1, even if the air pump 154 continues to run, because the vent 155 releases and vents pressure in the tank 152 at a flow rate that exceeds the flow rate of the air pump 154.

The brew chamber 1 may use any beverage making ingredient, such as ground coffee, tea, a flavored drink mix, or other beverage medium, e.g., contained in a cartridge 2 or not. Alternately, the brew chamber 1 may function simply as an outlet for heated, cooled or otherwise conditioned water or other liquid, e.g., where a beverage medium is contained in the cartridge 2. Once liquid delivery from the tank 152 to the brew chamber 1 is complete, the air pump 154 (or other air pump) may be operated to force air into the delivery line 156 to purge liquid from the brew chamber 1, at least to some extent.

Operation of the liquid pump 151, air pump 154 and other components of the apparatus 10 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

Prior to forming a beverage, the beverage forming apparatus 10 operates to suitably fill the heater tank 152 to the dispense level 159 (or to one of the dispense levels if more than one is used). To do so, the liquid pump 151 under the control of the control circuit 16 draws water from the reservoir W, which may be a cold water tank, a plumbed supply, etc. Optionally, the water may be filtered prior to entering the inlet of the liquid pump 151. The liquid pump 151 pumps water into the supply line 11, causing water to flow through the check valve 13 and the pressure relief valve 7 and to the heater tank 152. As water is forced into the heater tank 152, the liquid level in the tank 152 rises and air or other gas is forced out of the heater tank 152 and into the gas line 61. If the vent 155 is open, e.g., because the actuator 3 and/or cover 8 are moved from the closed position, air or other gas may exit the heater tank 152 via the vent valve 155.

Liquid is delivered to the heater tank 152 by the liquid pump 151 until a desired volume is present in the heater tank 152, e.g., determined by the control circuit 16 when the liquid level in the tank 152 reaches the dispense level 159 as detected by a conductive probe, optical sensor, pressure sensor, timed operation of the liquid pump 151, detected volume delivery by a flow meter in the supply line 11, etc. The liquid pump 151 is stopped, and if desired, liquid in the heater tank 152 is heated by the heating element 153 under the control of the control circuit 16. During heating, the liquid and/or gas in the heater tank 152 may expand in volume, and the expanding gas and/or liquid may flow into the gas line 61 to maintain pressure in the heater tank 152 at approximately ambient pressure. However, if the delivery line 156 is blocked, the pressure relief valve 7 may open if necessary to vent pressure from the supply line 11 and the heater tank 152. This may allow relatively cooler water to be released from the liquid supply 15, rather than relatively warmer water.

With the liquid in the heater tank 152 suitably heated, if desired and as detected by a thermocouple, thermistor, or other temperature sensor linked to the control circuit 16, liquid may be delivered from the heater tank 152 to the brew chamber 1. To do so, the control circuit 16 may turn the air pump 154 on, forcing air into the gas line 61. This causes air flow into the heater tank 152. Reverse flow in the supply line 11 is prevented by the check valve 13, and under normal operation where the opening pressure of the pressure relief valve 7 (e.g., about 15 psi) is higher than the opening pressure of the check valve 157 (e.g., about 0.5 psi), the pressure relief valve 7 may remain closed such that liquid flows through the check valve 157 and to the brew chamber 1. If in other embodiments the opening pressure of the pressure relief valve 7 is lower than the opening pressure of the check valve 157, the pressure relief valve 7 may open during liquid delivery to the brew chamber 1, but the pressure relief valve 7 may provide a restriction to flow so that a relatively small volume of liquid exits via the pressure relief valve 7.

Operation of the air pump 154 is continued by the control circuit 16 until the liquid level in the heater tank 152 drops to the post dispense level 158 or a suitable volume of liquid is otherwise delivered to the brew chamber 1. In this illustrative embodiment, once the liquid level in the heater tank 152 drops to the post dispense level 158, air is forced into the delivery line 156, helping to purge the delivery line 156 of liquid as well as help purge beverage from the brew chamber 1. In some embodiments, a pressure sensor in the tank 152 may detect the drop in pressure in the tank 152 once the liquid level drops to the post dispense level 158 and air is forced into the delivery line 156, causing the control circuit 16 to stop air pump 154 operation, e.g., after a suitable delay to purge the delivery line 156. Alternately, a drop in pressure in the heater tank 152 may be detected by a reduced load, and thus reduced current draw, at the air pump 154. In cases where the pressure in the heater tank 152 rises to an overpressure level, e.g., while the air pump 154 is running, but the liquid inlet at the brew chamber 1 is clogged or otherwise restricts flow, the pressure relief valve 7 may open to relieve pressure from the heater tank 152 (or not). The control circuit 16 may detect this condition, e.g., using a pressure sensor in the liquid supply 15, using a sensor that detects the pressure relief valve 7 opens, etc., and stop operation of the air pump 154. The control circuit 16 may prompt a user to take corrective action, e.g., by displaying a message at the user interface 14, and/or stop operation. Pressure in the heater tank 152 may also be vented if the vent 155 is opened by moving the actuator 3 and/or cover 8 from the closed position.

In the embodiment shown in FIG. 4, both the central inlet port and the peripheral inlet ports receive liquid from the same source: tank 152. However, in other embodiments, the central inlet port may receive liquid from a first source, and the peripheral inlet ports may receive liquid from a second source that is separate and distinct from the first source.

Figure 5:
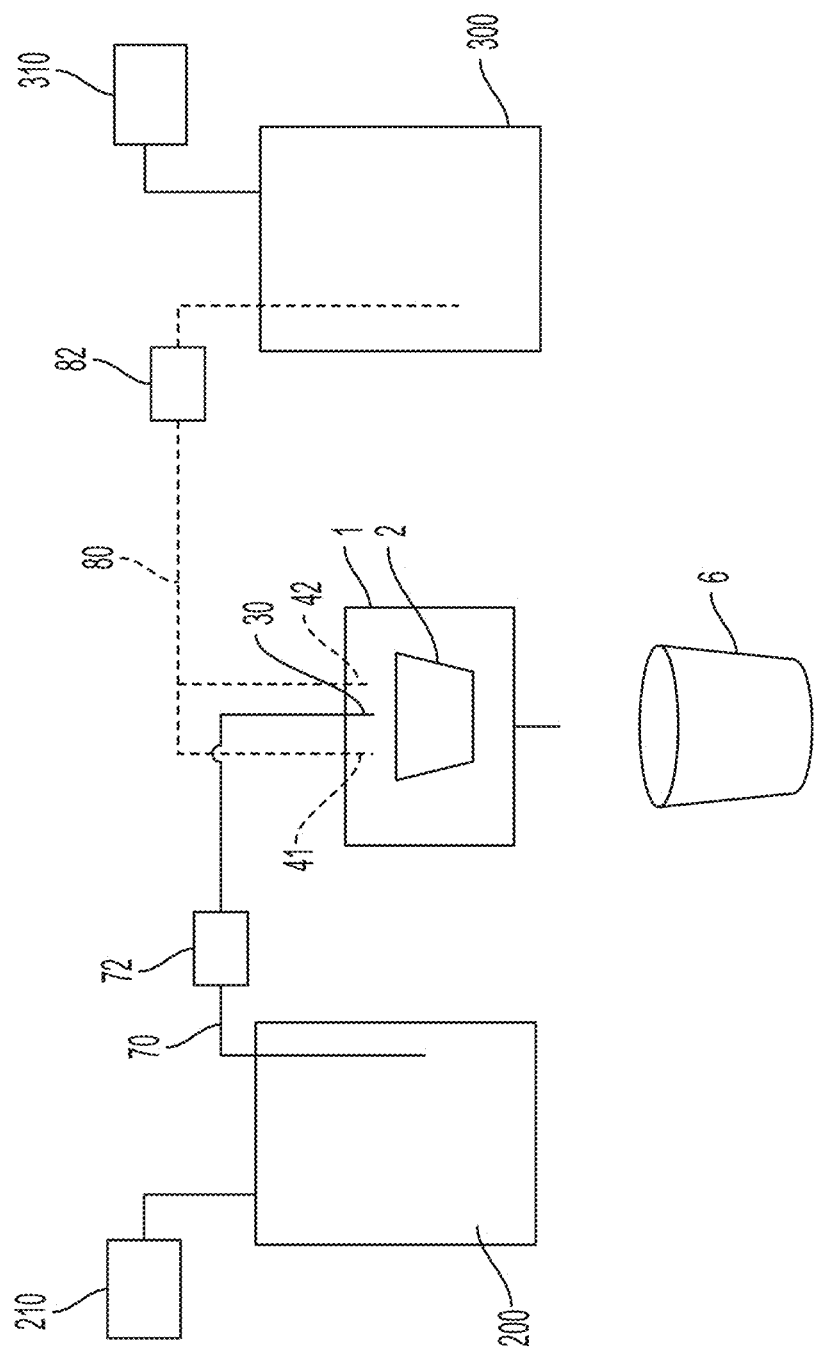
FIG. 5 is a schematic diagram of components of a beverage forming apparatus in an alternative illustrative embodiment.

In the illustrative embodiment shown in FIG. 5, a beverage forming apparatus may include two separate and distinct tanks, one configured to deliver liquid to the central inlet port, and another configured to deliver liquid to the peripheral inlet ports. Central delivery line 70 connects tank 200 to the central inlet port 30, and peripheral delivery line 80 connects tank 300 to the peripheral inlet ports 41, 42. In some embodiments, to selectively control dispensing from the input ports, a valve may be provided in each of the delivery lines. Valve 72 may be provided in the central delivery line 70, and valve 82 may be provided in the peripheral delivery line 80. To selectively control dispensing from the input ports, each valve may be independently controllable by a control circuit as discussed above. Each tank may have a designed pump to move liquid from the tank to its associated delivery line. Pump 210 pumps liquid from tank 200, and pump 310 pumps liquid from tank 300. In some embodiments, instead of using valves, control of the pumps may serve to achieve dispensing from the input ports. For example, dispensing from the central inlet port 30 is achieved by activating pump 210 to deliver a volume of liquid through the central delivery line 70 and into the central inlet port 30. Dispensing from the peripheral inlet ports 41, 42 is achieved by activating pump 310 to deliver a volume of liquid through the peripheral delivery line 80 and into the peripheral inlet ports 41, 42. In some embodiments, both valves and pump are used to selectively dispense from the input ports.

In some embodiments, the pumps may be configured to deliver liquid to their associated inlet ports at different flow rates. For example, in some embodiments, pump 210 may be configured to pump liquid from tank 200 to result in delivery of liquid from the central inlet port at a first flow rate, and pump 310 may be configured to pump liquid from tank 200 to result in delivery of liquid from each of the peripheral inlet ports at a second flow rate, where the second flow rate is different from the first flow rate.

Figure 6:
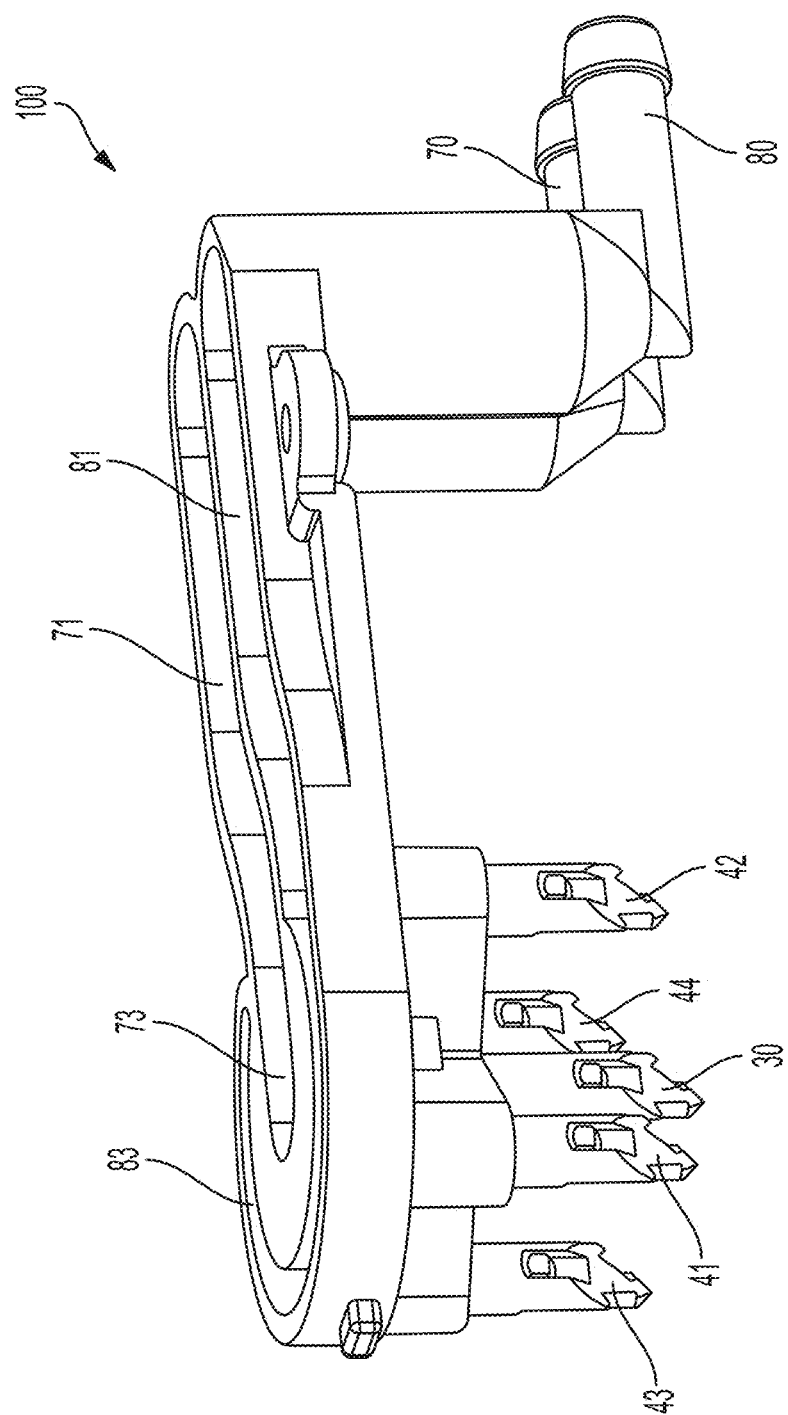
FIG. 6 is a perspective view of an inlet arrangement in an illustrative embodiment.
Figure 7:
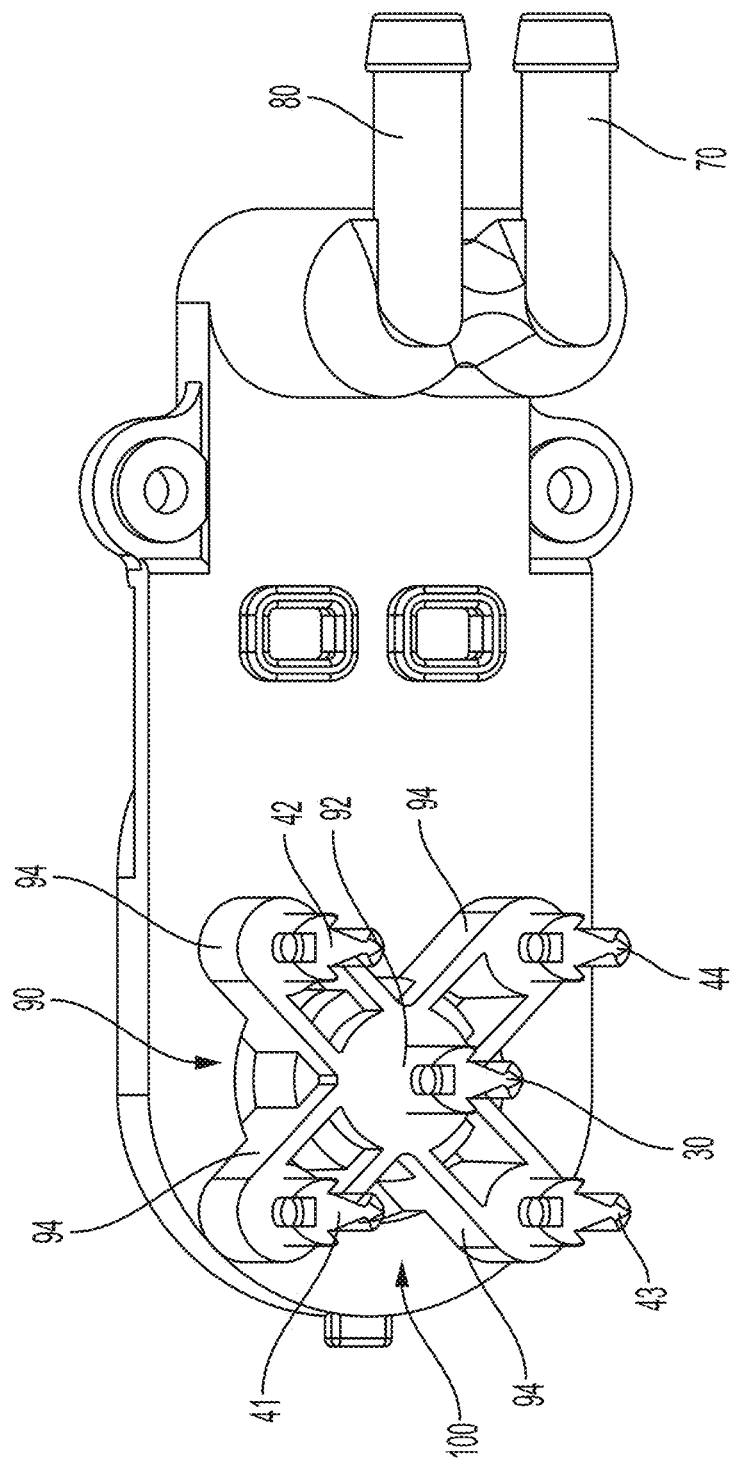
FIG. 7 is bottom perspective view of the inlet arrangement shown in FIG. 6.

One illustrative embodiment of an inlet arrangement is shown in FIGS. 6 and 7. Inlet arrangement 100 comprises five inlet ports: a central inlet port 30 and four peripheral inlet ports 41, 42, 43, and 44 arranged around the central inlet port 30. The peripheral inlet ports 41, 42, 43, and 44 are arranged in a rectangular shape, with each inlet port being positioned at a corner of the rectangle. In some embodiments, the rectangular shape comprises a square. The central inlet port 30 is positioned in the middle of the rectangular/square shape. As such, the central inlet port and the peripheral inlet ports form a quincunx, similar to the arrangement seen on the five-side of a die. Each of the peripheral inlet ports may be equidistant from the central inlet port.

It should be appreciated, however, that other numbers of inlet ports and other inlet port layouts are possible. As an example, in some embodiments, an inlet arrangement may have 2, 3, 4, 5, 6, 7, 8, 9, or 10 peripheral inlet ports. The peripheral inlet ports may surround the central inlet port in an equally spaced manner such that each of the inlet ports are equally spaced from one another and/or equidistant from the central inlet port. In other embodiments, however, the peripheral inlet ports may be arranged in an irregular manner such that spacing between inlet ports is non-uniform and/or distance between the central inlet port and each of the peripheral inlet ports is not equal.

In embodiments with two peripheral inlet ports, the peripheral inlet ports are considered to "surround" the central inlet port by having the central inlet port flanked by the peripheral inlet ports, even if all three ports are not in a straight line.

The peripheral inlet ports may be arranged in different shapes, such as a rectangle, square, circle, oval, triangle, pentagon, hexagon, octagon, or any other suitable shape.

In some embodiments, an inlet arrangement may have more than one central inlet port. For example, an inlet arrangement may comprise 2 or 3 central inlet ports surrounded by a plurality of peripheral inlet ports.

In some embodiments, the inlet ports all extend to the same depth. In some embodiments, one or more of the inlet port extend to a depth different from that of another inlet port. In one illustrative embodiment, a central inlet port extends to a depth further than that of the peripheral inlet ports.

In the embodiment shown in FIGS. 6 and 7, each of the inlet ports comprises a piercing element, e.g. a needle, configured to pierce a cartridge. However, it should be appreciated that an inlet port need not necessarily include a needle or any other piercing element. In alternative embodiments, an inlet port may have a blunt distal end rather than a pointed distal end. For example, an inlet port may be shaped as a cylinder having a flat, circular distal end, or a rectangular prism having a flat, rectangular or square distal end.

In the embodiment shown in FIGS. 6 and 7, a first delivery line provides liquid to the central inlet port, and a second delivery line provides liquids to each of the peripheral inlet ports. As best seen in FIG. 6, the beverage forming apparatus includes a central delivery line 70 and a peripheral delivery line 80. Central delivery line 70 includes a path 71 that leads to the central inlet port 30. Peripheral delivery line 80 includes a path 81 that leads to the peripheral inlet ports 41, 42, 43 and 44. The distal portion of path 81 forms a curved shape to connect with each of the peripheral inlet ports. In some embodiments, the distal portion 83 of the peripheral delivery line path 81 at least partially surrounds the distal end 73 of the central delivery line path 71. The distal portion of the peripheral delivery line path may form any suitable shape, such as, but not limited to, a curve, a c-shape, or a partial rectangle.

In some embodiments, the inlet arrangement may include a port hub from which each of the inlet ports extend. In the embodiment shown in FIG. 7, the inlet arrangement includes a port hub 90 having a central portion 92 and a plurality of arms 94 extending from the central portion. The central inlet port 30 extends from the central portion 92, and each of the plurality of peripheral inlet ports extends from an arm 94. The arms 94 are arranged in an X shape, which could also be described as a plus-sign shape or cross shape. In some embodiments, the port hub and inlet ports are integrally formed as a single component (e.g. molded as a single part).

It should be appreciated that, in other embodiments, a different number of arms may be included in the port hub. For example, an inlet arrangement could use 2, 3, 4, 5, 6, 7, 8, 9, or 10 arms. The arms may be evenly rotationally spaced around the central inlet port, or may be irregularly spaced.

In some embodiments, such as the embodiment shown in FIGS. 6-7, each of the inlet ports may be identical to one another in size and shape. It should be appreciated, however, that in other embodiments, the inlet ports need not be the same size and/or shape as one another. In some embodiments, one or more inlet ports are differently sized and/or shaped from other inlet ports. One or more inlet ports may be longer or shorter than other inlet ports. In one illustrative embodiment, the central inlet port is longer than each of the peripheral inlet ports, or the central inlet port may otherwise extends to a distance that extends past each of the peripheral inlet ports. In other embodiments, the central inlet port may be shorter than one or more of the peripheral inlet ports, or one or more of the peripheral inlet ports may otherwise extend to a distance that extends past the central inlet port. In another embodiments, one of the peripheral inlet ports is longer than the other peripheral inlet ports, or otherwise extends to a distance that extends past the other peripheral inlet ports.

Figure 8:
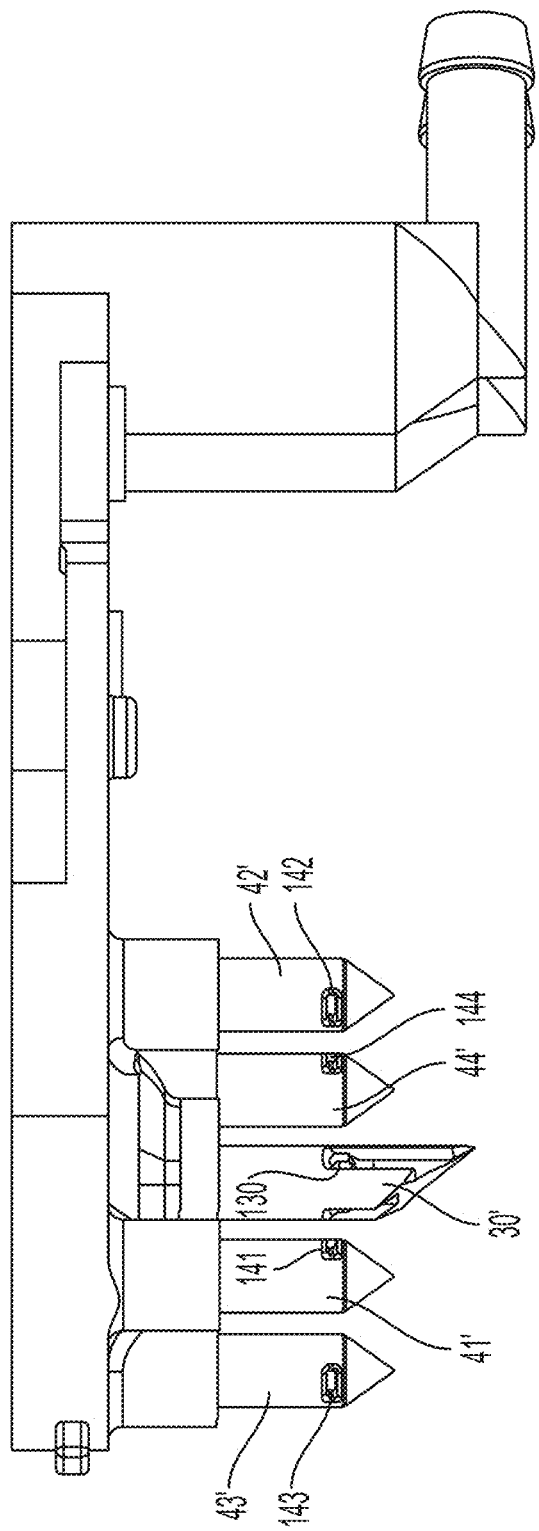
FIG. 8 is a side view of an inlet arrangement in an alternative illustrative embodiment.

In the illustrative embodiment shown in FIG. 8, the central inlet port 30' extends to a distance that extends past the peripheral inlet ports 42'. The peripheral inlet ports 42' are also shaped differently than the central inlet port 30'. In the embodiment shown in FIG. 8, the central inlet port 30' has a slanted piercing end. The peripheral inlet ports 42', however, each have a conical, rotationally symmetrical piercing end. The piercing end of the central inlet port 30' is longer than the piercing ends of the peripheral inlet ports 42'.

According to some embodiments, a needle arrangement may include peripheral inlet ports having inlet holes that are specifically arranged relative to the central inlet port. In some embodiments, the inlet holes of peripheral inlet ports are arranged in a manner to cover a larger area, e.g. for increased wetting.

In some embodiments, instead of having inlet holes on the peripheral inlet ports that are directed radially inwardly toward the central inlet port, the inlet holes of the peripheral inlet ports are directed in a direction that is perpendicular to the radially inward direction. Such inlet holes of the peripheral inlet ports may serve to cover a wider peripheral area surrounding the central inlet port.

Figure 9:
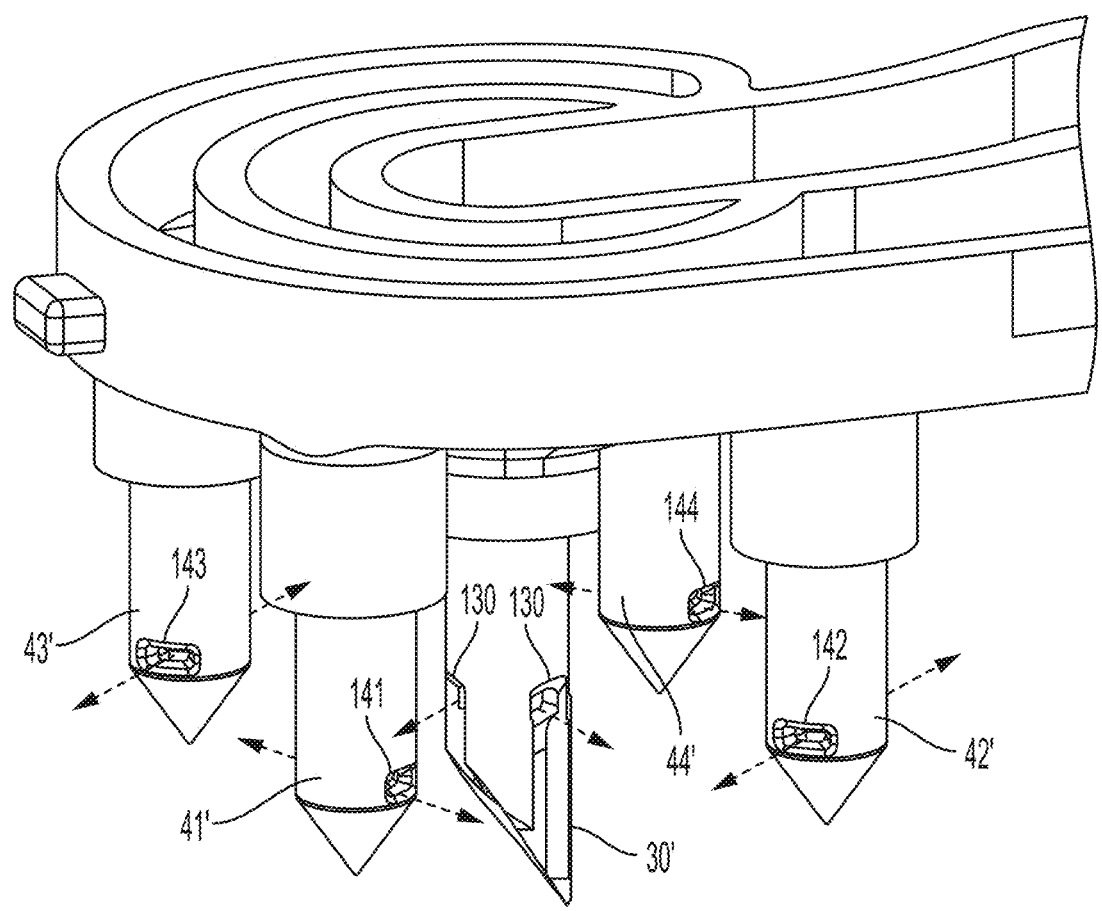
FIG. 9 is a perspective view of the inlet arrangement of FIG. 8 with inlet hole directions indicated.
Figure 10:
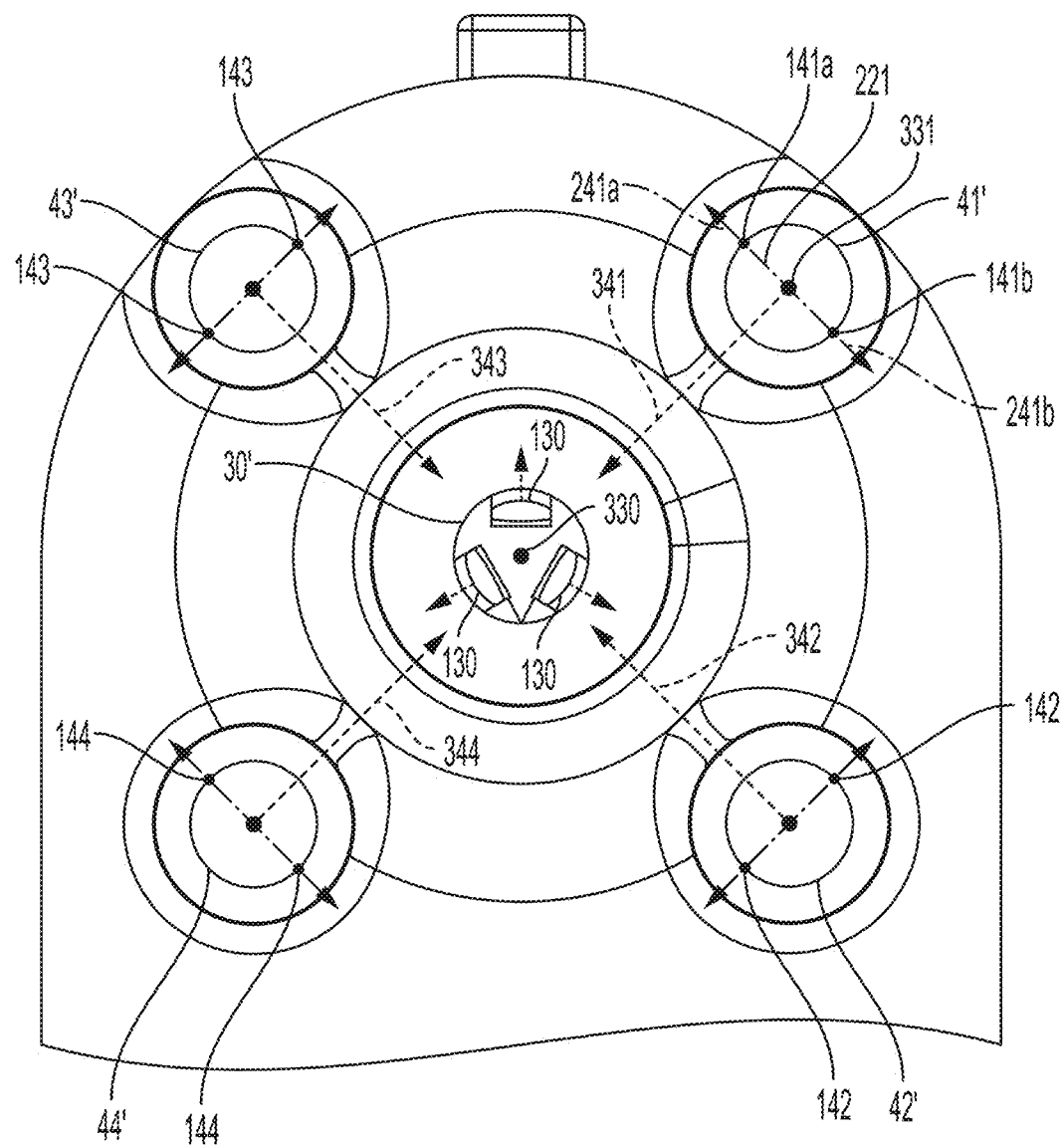
FIG. 10 is a bottom plan view of the inlet arrangement shown in FIG. 8 with inlet hole directions indicated.

In one illustrative embodiment shown in FIGS. 9 and 10, each of the peripheral inlet ports 42' includes two inlet holes through which fluid is delivered. As best seen in the bottom plan view of FIG. 10, the inlet holes of each peripheral inlet port are directed in a particular manner relative to a center point 330 of the central inlet port 30'. Taking peripheral inlet port 41' as an example, a direction 341 extending from the center point 331 of the peripheral inlet port 41' toward the center point 330 of the central inlet port 30' defines the radially inward direction for peripheral inlet port 41'. The inlet holes 141a, 141b of the peripheral inlet port 41' each face a direction that is perpendicular to this radially inward direction 341. Inlet hole 141a faces direction 241a and inlet hole 141b faces direction 241b, where directions 241a and 241b are opposite to one another. As shown by line 221 connecting directions 241a and 241b, the directions 241a and 241b are also perpendicular to the radially inward direction 341. The inlet holes 141a, 141b are also positioned on a diameter of the inlet port 41'.

The other peripheral inlet ports 42', 43', and 44' may be similarly arranged. For example, inlet port 42' may have two inlet holes 142 that face directions that are perpendicular to a radially inward direction 342, inlet port 43' may have two inlet holes 143 that face directions that are perpendicular to a radially inward direction 343, and inlet port 44' may have two inlet holes 144 that face directions that are perpendicular to a radially inward direction 343.

It should be appreciated that, in some embodiments, each peripheral inlet port may have only one inlet hole rather than two.

While the inlet holes of the peripheral inlet ports face directions perpendicular to the radially inward direction, the central inlet port may have one or more inlet holes that face in a radially outward direction. Such holes may serve to cover an area between the central inlet port and the peripheral inlet ports.

In the illustrative embodiment of FIG. 10, the central inlet port 30' has three inlet holes 130. Each of the inlet holes face a radially outward direction. While the central inlet port 30' has three inlet holes, it should be appreciated that other numbers as possible, such as 1, 2, 4, 5, or 6 inlet holes. In some embodiments, when a plurality of inlet holes are used, the inlet holes may be evenly spaced around the circumference of the central inlet port. However, in other embodiments, the inlet holes may be non-evenly spaced.

According to some embodiments, a gasket arrangement may be used with an inlet port arrangement to facilitate delivery of fluid to a beverage cartridge. In some embodiments, a gasket arrangement includes an individual gasket for each inlet port. The individual gaskets may be connected to one another, e.g. for ease of manufacturing the gasket arrangement and/or ease of assembling the gasket arrangement onto the inlet port arrangement.

Figure 11:
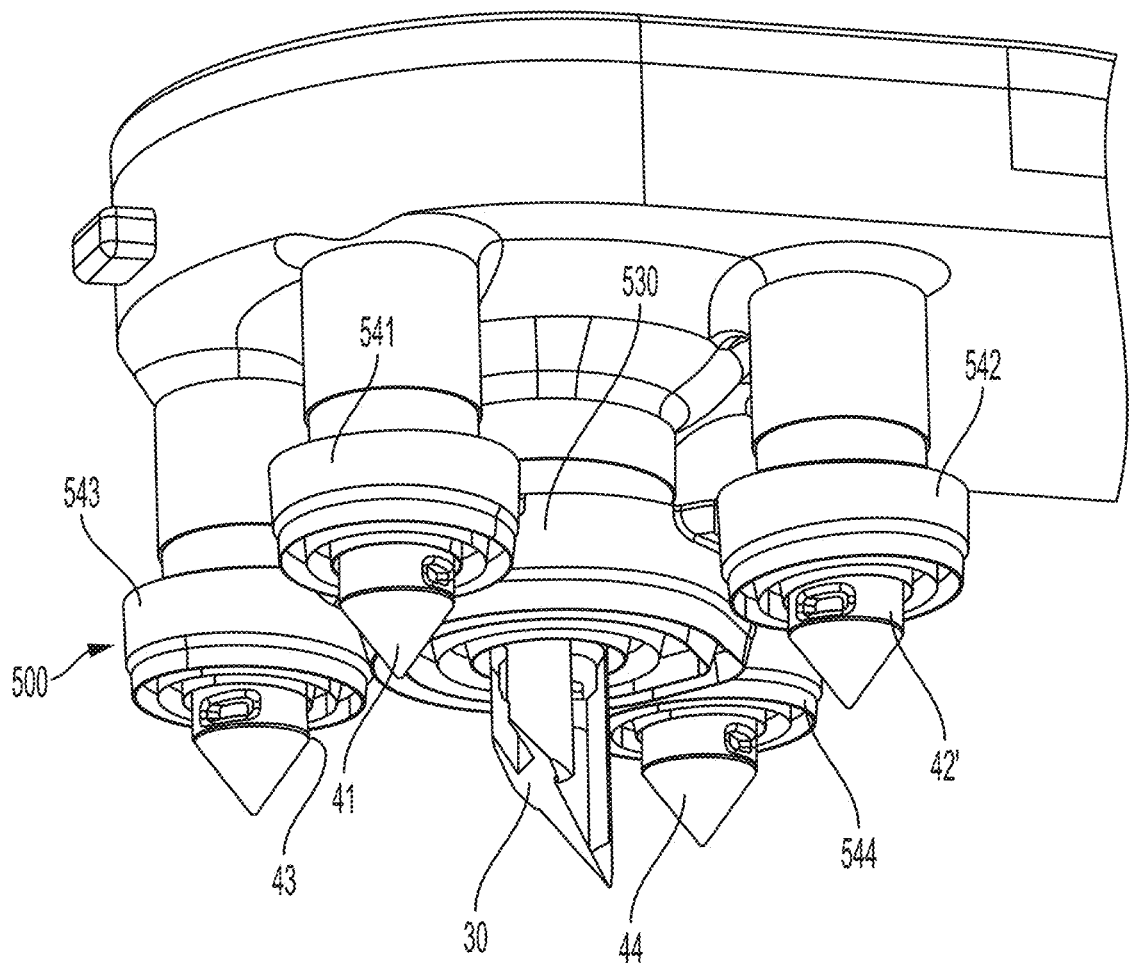
FIG. 11 is a perspective view of an inlet arrangement and a gasket arrangement in an illustrative embodiment.
Figure 12:
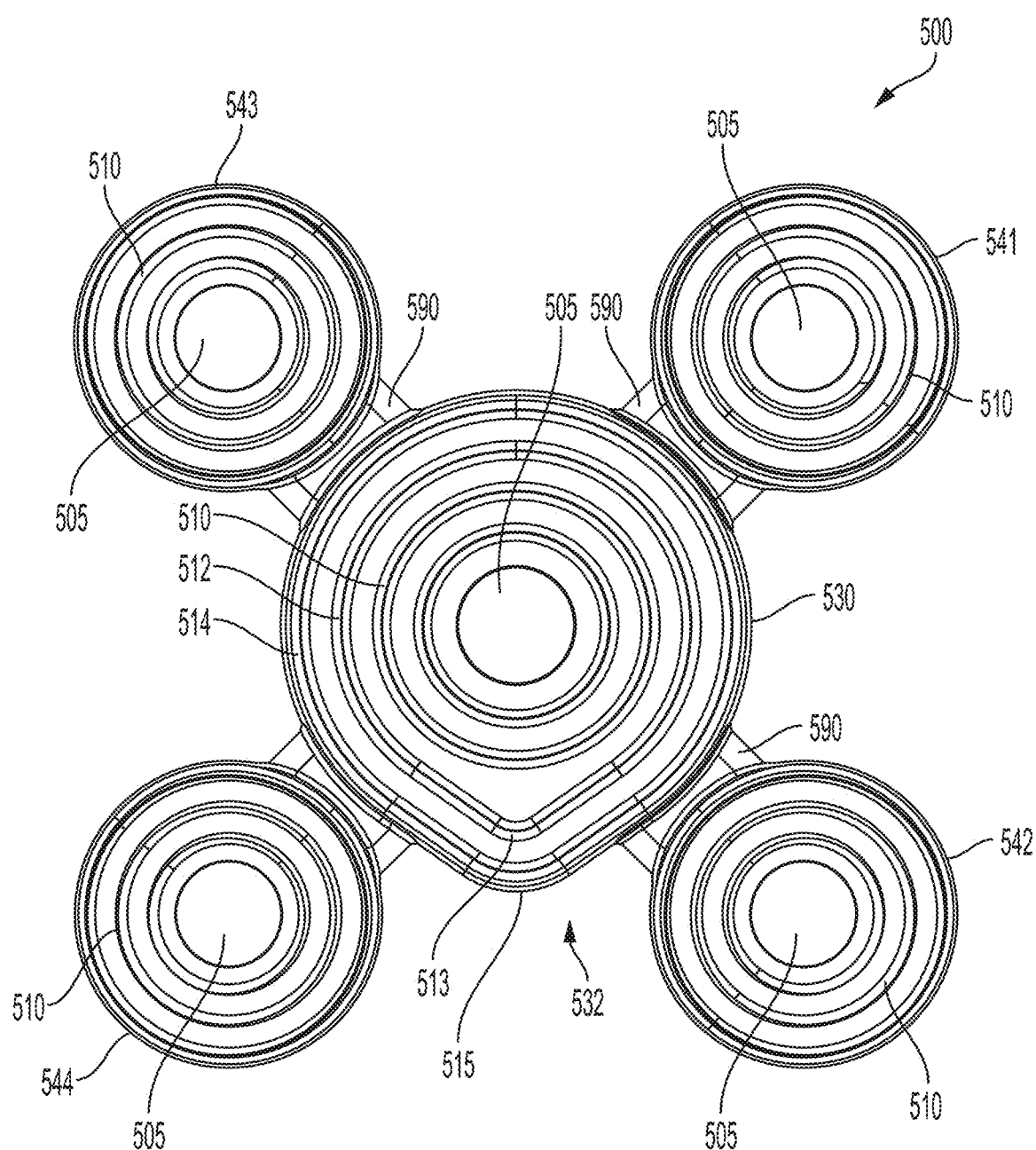
FIG. 12 is a bottom plan view of the gasket arrangement shown in FIG. 11.

One illustrative embodiment of a gasket arrangement is shown in FIGS. 11-12. The gasket arrangement 500 includes five gaskets: one central gasket 530 and four peripheral gaskets 541, 542, 543, and 544. Each of the peripheral gaskets are connected to the central gasket 530 via bridges 590.

In some embodiments, the gasket arrangement includes a plurality of openings for receiving the inlet ports of the inlet port arrangement. In some embodiments, the gaskets may attach to the inlet ports via friction, e.g. via an interference fit between the inlet port within the gasket opening. The gaskets may be made of an elastic material that compresses against the inlet port to retain the gaskets with the inlet ports. In some embodiments, the gasket arrangement may be removable from the inlet arrangement without damaging the gasket arrangement or the inlet arrangement. For example, if the gasket arrangement is retained on the inlet ports via friction, a user can manually pull the gasket arrangement off of the inlet ports. In other embodiments, an adhesive or other bonding material may be used to permanently attach the gasket arrangement to the inlet ports.

As shown in the illustrative embodiment of FIG. 12, each gasket may include an opening 505 for receiving a corresponding inlet port. The openings are arranged to match with the positions of the inlet ports of an inlet port arrangement. In the embodiment shown in FIGS. 11-12, to match the quincunx arrangement of the inlet ports, the gasket openings 505 are also arranged in a quincunx.

In some embodiments, the gaskets within a gasket arrangement may be different sizes and/or shapes. In the illustrative embodiment of FIG. 12, the central gasket 530 is larger than each of the peripheral gaskets 541, 542, 543, and 544.

In some embodiments, a gasket arrangement includes multiple ribs to facilitate sealing. In some embodiments, each rib may form a closed shape. In some embodiments, a gasket may have multiple ribs, where an outer rib encloses a smaller inner rib, and the inner rib may enclose yet another smaller rib.

In the illustrative embodiment shown in FIGS. 11 and 12, the gasket arrangement includes a plurality of ribs. For the peripheral gaskets 541, 542, 543, and 544, the ribs comprise concentric circles of increasing diameters. For the central gasket 530, the gasket includes circle-shaped ribs 510, as well as ribs 512, 514 having teardrop shapes, as will be discussed in more detail below.

The gasket arrangement may be integrally formed as a one-piece construction. However, in other embodiments, the gasket arrangement may comprise gaskets that are not directly connected to one another. In some embodiments, the gaskets may be spaced from one another.

As discussed above, in some embodiments, the inlet port arrangement includes piercing elements that are mounted to a brew chamber lid that closes and opens. With a beverage cartridge positioned in the brew chamber, closure of the brew chamber lid may cause the piercing elements of the inlet port arrangement to pierce into a beverage cartridge. In some embodiments, rather than moving in a purely 1-dimensional direction toward and away from the beverage cartridge, the brew chamber lid may move in an arc during closure (or other movement direction that has lateral movement such that the movement direction is in at least 2 dimensions). As a result, as the brew chamber lid closes, instead of approaching the beverage cartridge lid in a straight-on fashion in which the movement direction of the piercing elements is perpendicular to a beverage cartridge lid or other surface intended to be pierced, the piercing elements may pierce into the beverage cartridge lid with some lateral movement. Lateral movement of the piercing element as it pierces into the beverage cartridge lid may result in tearing a portion of the beverage cartridge lid. The resulting hole in the lid formed by the piercing element may be larger than the cross-sectional area of the inlet port. Providing the inlet port arrangement with a gasket arrangement may help to decrease leaking through the resulting hole during brewing, if the gasket is sized to be larger than the hole.

In some embodiments, a gasket may include an extension area at locations that would overlap with potential beverage cartridge lid tears when the gasket comes into contact with a beverage cartridge during closure of a brew chamber lid. In the illustrative embodiment shown in FIG. 12, the central gasket 530 includes an extension area 532 that forms a rounded corner. In the area of the extension 532, the outermost rib 514 may include a rounded corner 515 to form a teardrop shape, and the second outermost rib 512 may also include a rounded corner 513 to form a teardrop shape. The other subsequent inner ribs 510 may be circular. As such, the ribs of a gasket may have different shapes.

Figure 13:
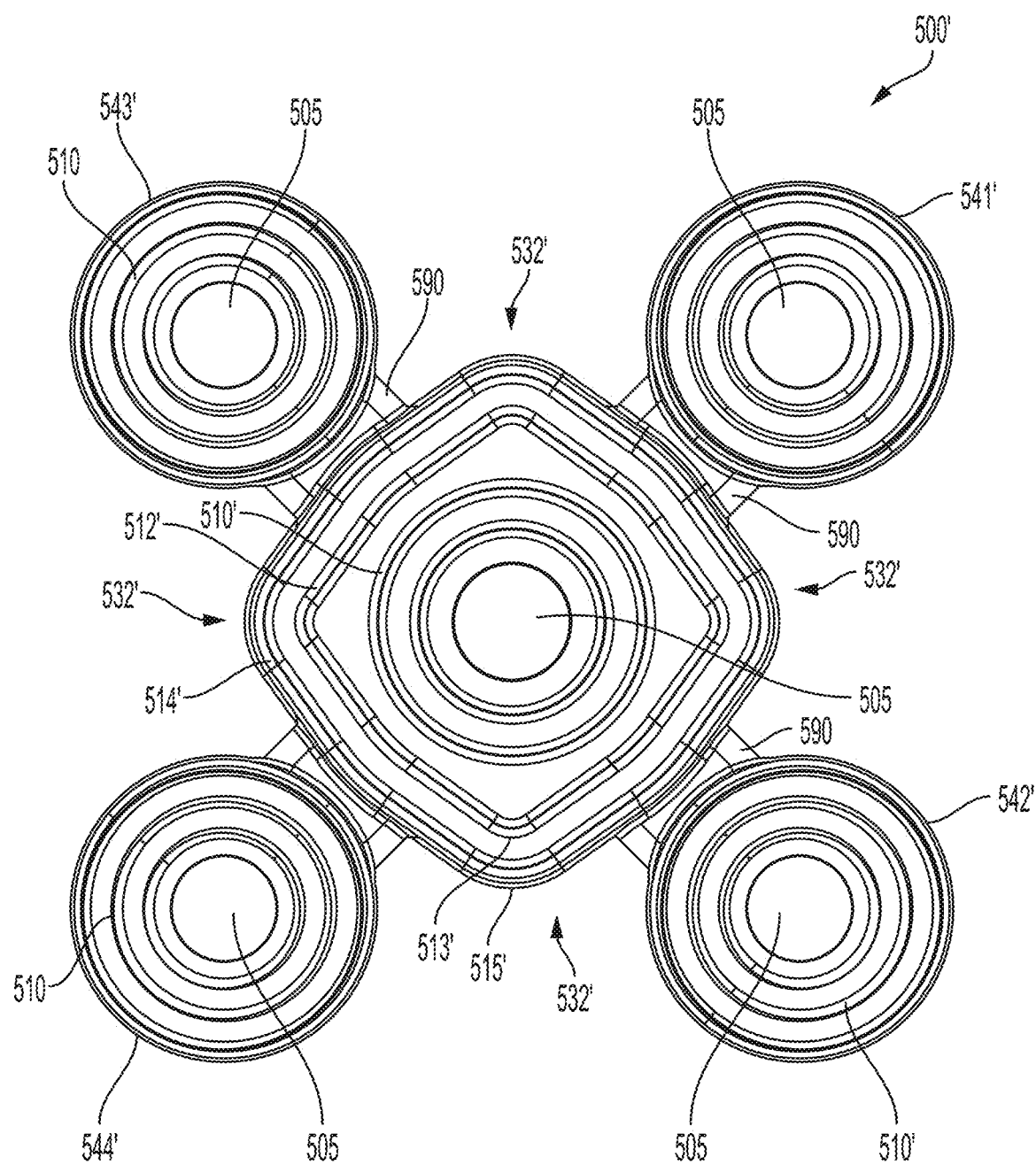
FIG. 13 is a bottom plan view of a gasket arrangement in an alternative illustrative embodiment.

It should be appreciated that a gasket arrangement may have more than one extension area. In the illustrative embodiment shown in FIG. 13, the gasket arrangement 500 has four extension areas 532', each forming a rounded corner. For each extension, the outermost rib 514' forms a rounded corner 515' in the area of the extension. In addition, for each extension area, the second outermost rib 512' forms a rounded corner 513' in the area of the extension area. As a result, the central gasket 530 may form an approximately square shape. The square shape may have rounded corners, and on the sides, the center portion of each side may bulge out slightly.

It should be appreciated that other gasket arrangement shapes are possible. For example, the gasket arrangement may be a single unitary shape with a plurality of openings for receiving inlet ports. As illustrative examples, the gasket may be a single circle or square with five openings for receiving five inlet ports.

Figure 14:
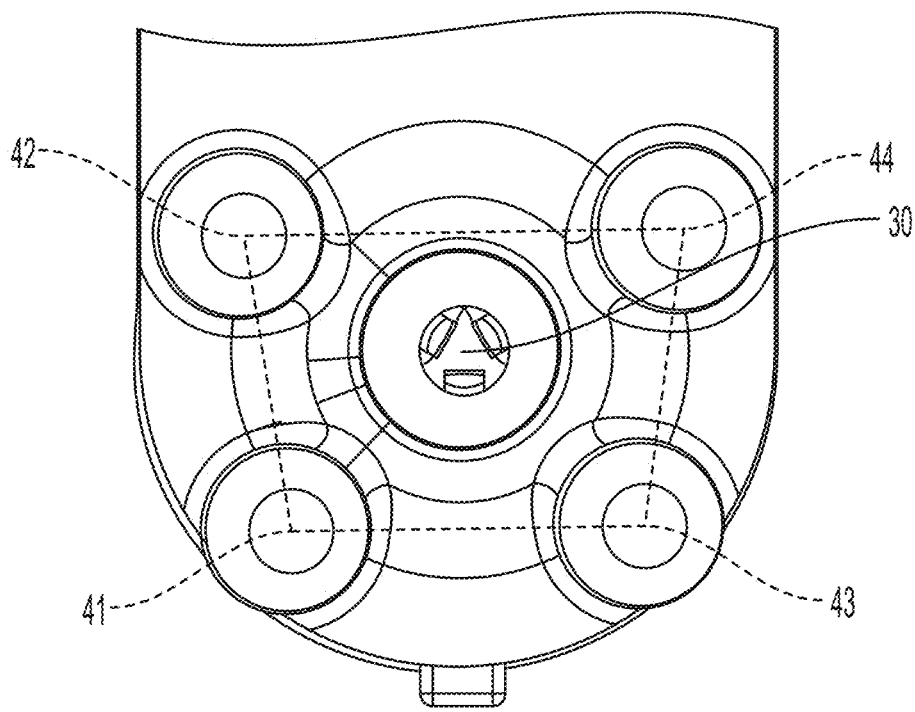
FIG. 14 is a bottom view of an inlet arrangement in an embodiment in which peripheral inlet ports are arranged in a trapezoidal orientation.
Figure 15:
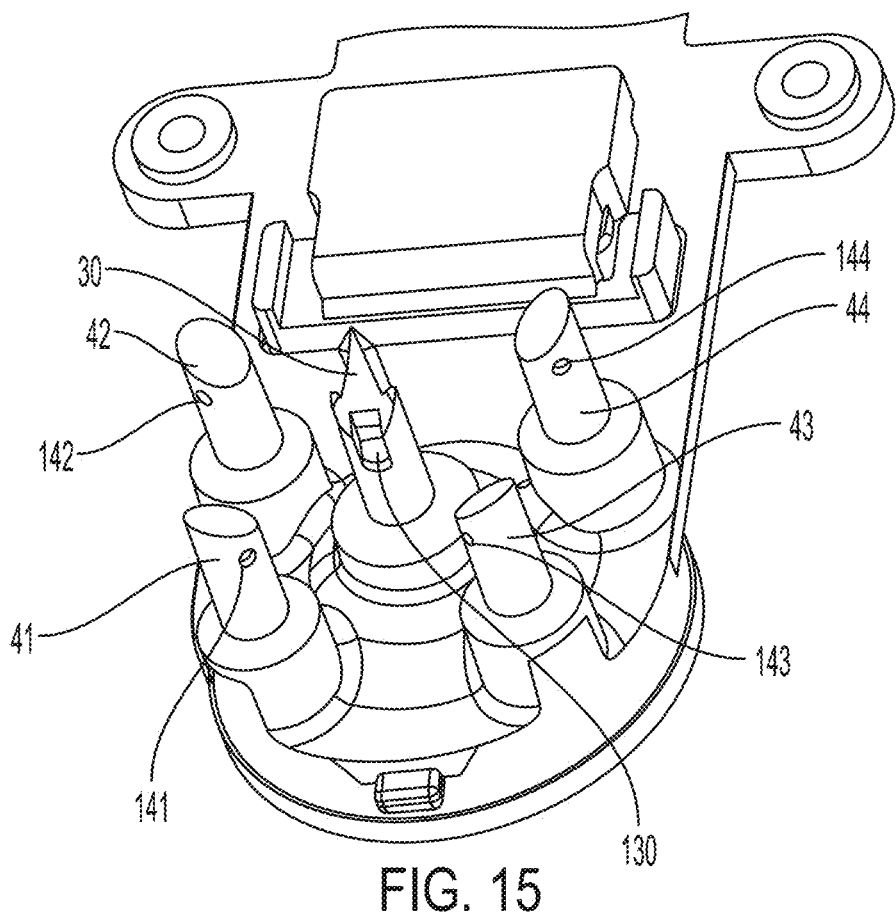
FIG. 15 is a bottom perspective view of the FIG. 14 embodiment.

FIGS. 14 and 15 show another illustrative inlet arrangement that is similar to that in FIGS. 6-11. This embodiment includes a central inlet port 30 and four peripheral inlet ports 41, 42, 43, and 44 arranged around the central inlet port 30. However, as can be seen in FIG. 14 the four peripheral inlet ports 41-44 are positioned at a respective vertex of an isosceles trapezoid and the central inlet port is positioned within the isosceles trapezoid. (The isosceles trapezoid is shown in dashed line in FIG. 14.) That is, if the centers of the peripheral inlet ports 41-44 are connected by straight lines, the lines will form an isosceles trapezoid. This is in contrast to embodiments described above in which four peripheral inlet ports are located at vertices of a rectangle. The inlet arrangement 100 has a front and a rear, which corresponds to a front and a rear of a brew chamber that the inlet arrangement 100 is used with. In FIG. 14, the front of the inlet arrangement is at the bottom of the figure, and the rear is at a top of the figure. The four peripheral inlet ports include two rear peripheral inlet ports 42, 44 and two front peripheral inlet ports 41, 43. The two rear peripheral inlet ports 42, 44 are located at ends of a longer one of the two parallel sides of the isosceles trapezoid, and two front peripheral inlet ports 41, 43 are located at ends of a shorter one of the two parallel sides of the isosceles trapezoid. Thus, the two rear peripheral inlet ports 42, 44 are positioned farther from each other than the two front peripheral inlet ports 41, 43. However, the central inlet port 30 is equidistant from all four of the peripheral inlet ports 41-44. This arrangement of inlet ports may provide advantages, such as allowing a beverage machine to provide liquid into a capsule or other beverage material holder in different ways. For example, the inlet arrangement may pierce a capsule having a sidewall with a circular cross section so that the peripheral ports 41-44 will be positioned at different distances from the capsule sidewall. For example, the two rear peripheral inlet ports 42, 44 may be positioned closer to the capsule sidewall than the two front peripheral inlet ports 41, 43. As a result, liquid exiting the two front peripheral inlet ports 41, 43 may have a different effect than liquid exiting the two rear peripheral inlet ports 42, 44. The beverage machine may exploit these differences, which may result in formation of different beverage characteristics for one type of capsule and/or type of beverage. For example, roast and ground coffee may form a preferable beverage using the two front peripheral inlet ports 41, 43 than the two rear peripheral inlet ports 42, 44 (e.g., because of better wetting of the grounds). In contrast, a soluble drink mix may dissolve better when liquid is introduced using the two rear peripheral inlet ports 42, 44 than the two front peripheral inlet ports 41, 43 (e.g., because turbulence caused by liquid striking the capsule wall may promote mixing). While the inlet ports 30, 41-44 may be arranged at different distances from each other in different embodiments, each of the four peripheral inlet ports and the central inlet port may be arranged to individually pierce a lid of capsule in the brew chamber. That is, the ports may be arranged so that each port forms a single hole in a capsule lid or other capsule portion that is separate and distinct from a hole formed by another port.

Although the inlet ports 30, 41-44 are positioned differently than that in FIGS. 6-11, the embodiment in FIGS. 14 and 15 may include any suitable combination of features included in the FIGS. 6-11 embodiments. For example, the central inlet port 30 may have a length that is different, e.g., longer, than a length of at least one of, or all four of, the plurality of peripheral inlet ports, and the peripheral inlet ports 41-44 may have the same length. Also, the central inlet port 30 may have a shape that is different from a shape of the four peripheral inlet ports 41-44, whether the peripheral inlet ports have a pointed distal end, a chamfered or angled distal end, etc. All of some of the four peripheral inlet ports may each have a first inlet hole 141-144 and a second inlet hole 141-144 through which liquid is dispensed, and the first inlet hole may be directed in a first direction perpendicular to a radially inward direction and the second inlet hole may be directed in a second direction opposite to the first direction and perpendicular to the radially inward direction, e.g., as shown in FIG. 10. Likewise, the central inlet port may include a plurality of inlet holes 130 through which liquid is dispensed with the plurality of inlet holes being directed in radially outward directions, as shown in FIG. 10. The central inlet port and the four peripheral inlet ports may be mounted on a lid of the brew chamber that is movable relative to a cartridge holder, which may have a cup-shaped area to receive a capsule. Thus, the central inlet port and the four peripheral inlet ports may be movable relative to cartridge holder to pierce the capsule in the cartridge holder. The inlet arrangement may be part of a beverage machine or other system that has a liquid supply configured to provide liquid to the liquid inlet, and a liquid conditioner configured to heat and/or cool the liquid provided to the liquid inlet. A control circuit may be arranged to control operation of the liquid supply and the liquid condition to provide liquid to the liquid inlet, e.g., as discussed above so that liquid is dispensed from the central inlet port only, from at least one of the four peripheral inlet ports only, and/or from the central inlet port and at least one of the four peripheral inlet ports. Liquid delivery through the central inlet port into the brew chamber may be at a first flow rate, and liquid delivery through one of the four peripheral inlet ports into the brew chamber may be at a second, different flow rate.

Figure 16A:
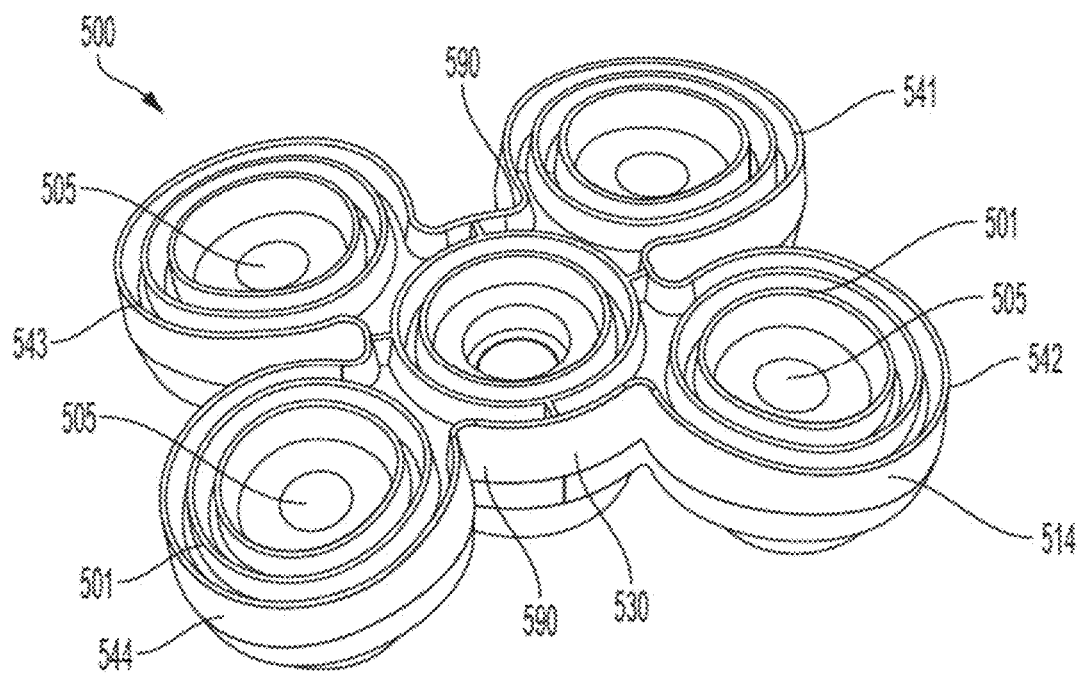
FIG. 16A is a bottom perspective view of a gasket arrangement for use with the FIG. 14 inlet arrangement.
Figure 17:
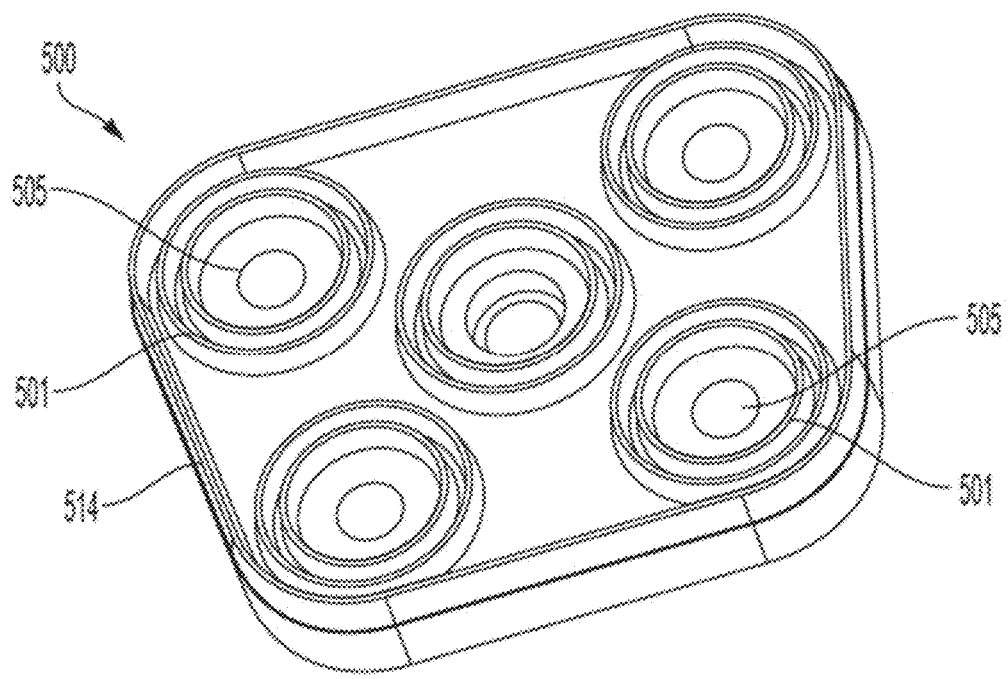
FIG. 17 is a bottom perspective view of another gasket arrangement having a trapezoidal contour for use with the FIG. 14 inlet arrangement.

As with the other inlet arrangements, the inlet arrangement 100 in FIGS. 14 and 15 may include a suitable gasket to form a seal with a capsule or other component. The gasket arrangements in FIG. 12 or 13 may be employed (with suitable modifications to accommodate the peripheral inlet port 41-44 position), or others. For example, FIGS. 16A and 17 show two alternate gasket arrangements that may be used with the FIGS. 14 and 15 inlet arrangement. FIG. 16A shows a gasket arrangement 500 similar to that in FIGS. 12 and 13 with five gaskets: one central gasket 530 and four peripheral gaskets 541, 542, 543, and 544 and bridges 590 connecting the gasket portions. Generally circular ribs 501 are formed around each opening 504, 505 arranged to receive a corresponding port 30, 41-44. The outermost rib 514 may generally follow the contour of the gasket 500, which has a clover-leaf shape.

According to one aspect, a gasket arrangement may have a bottom side with a flat central portion and one or more peripheral portions that are oriented at an angle relative to the flat central portion. In some situations, one or more angled peripheral portions on a gasket arrangement may help with sealing against a capsule lid.

Figure 16B:
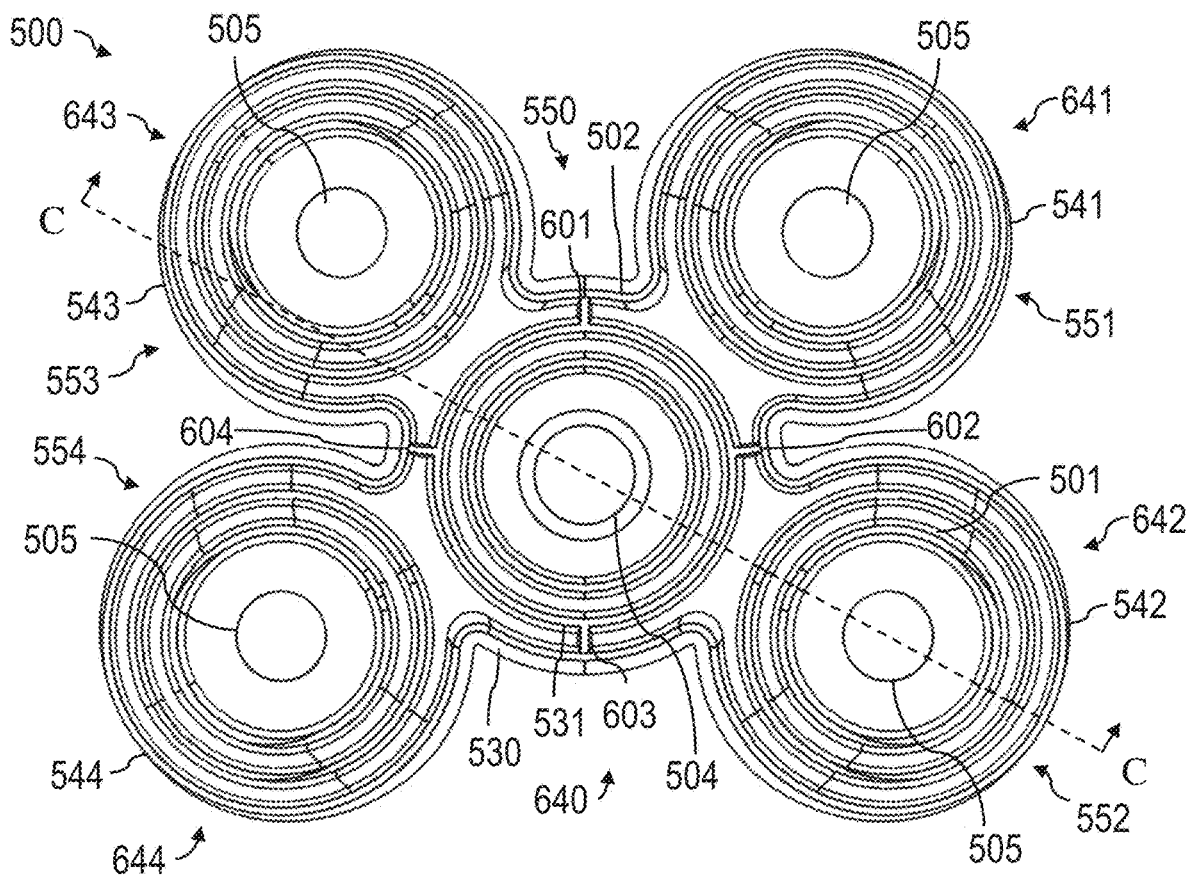
FIG. 16B is a bottom plan view of the gasket arrangement of FIG. 16A.
Figure 16C:
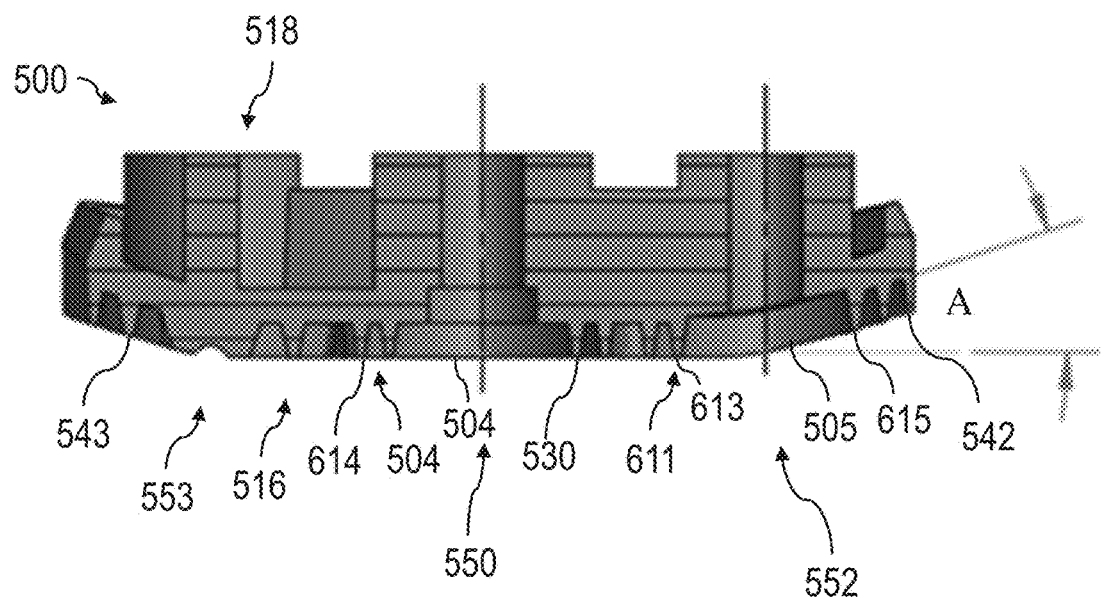
FIG. 16C is a cross-section of the gasket arrangement of FIG. 16B taken along line C-C.

FIG. 16B shows a bottom plan view of the bottom side of the gasket arrangement, and FIG. 16C is a cross-section of the gasket arrangement along line C-C in FIG. 16B. As seen in FIG. 16C, the gasket arrangement includes a bottom side 516 and an opposite top side 518.

In some embodiments, each of the peripheral gaskets may be part of peripheral portions of the gasket arrangement, and the central gasket may be part of a central portion of the gasket arrangement. In the illustrative embodiment of FIG. 16B, each of the peripheral gaskets 541, 542, 543 and 544 form peripheral portions of the gasket arrangement, and central gasket 530 forms a central portion of the gasket arrangement. A central portion 550 of the gasket arrangement includes the central gasket 530, a first peripheral portion 551 of the gasket arrangement includes the first peripheral gasket 541, a second peripheral portion 552 of the gasket arrangement includes the second peripheral gasket 542, a third peripheral portion 553 of the gasket arrangement includes the third peripheral gasket 543, and a fourth peripheral portion 554 of the gasket arrangement includes the fourth peripheral gasket 544.

Figure 16D:
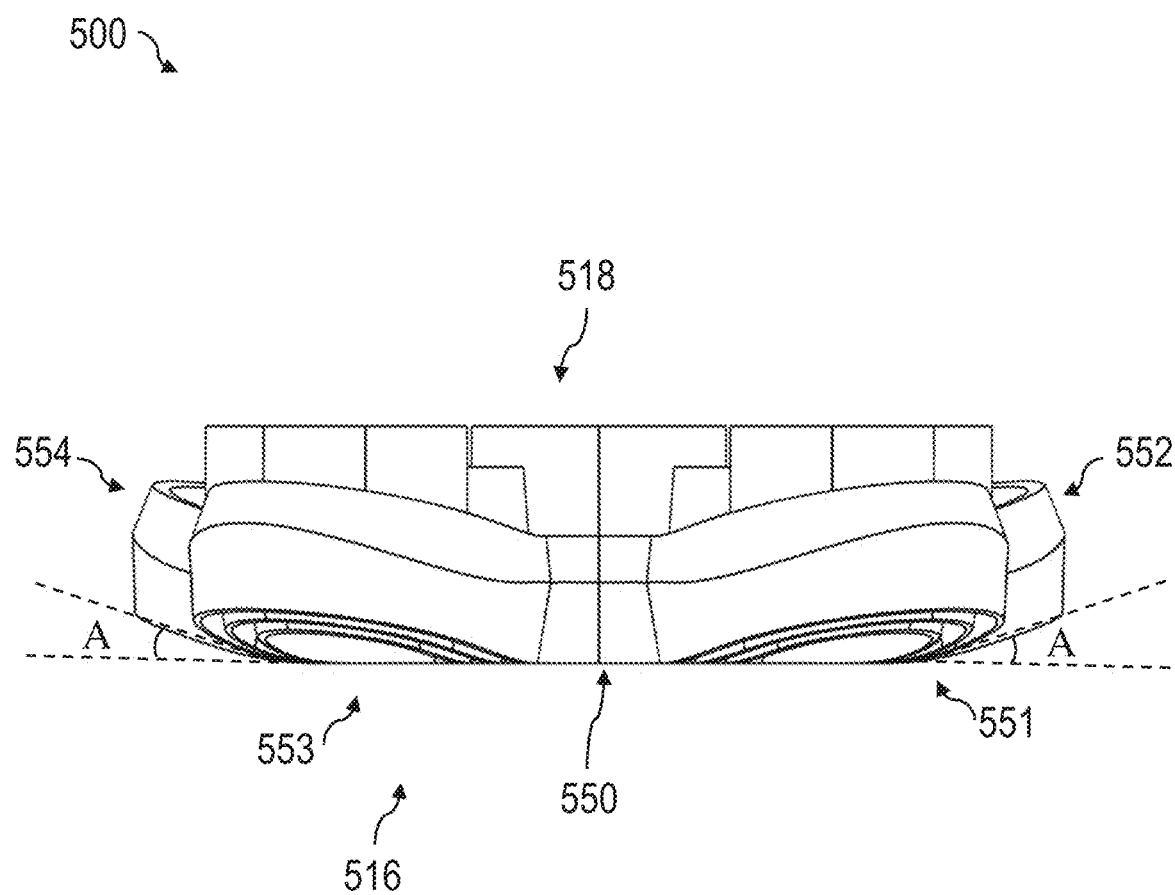
FIG. 16D is a side view of the gasket arrangement of FIG. 16B.

As seen in FIG. 16C, the central portion 550 of the bottom side 516 of the gasket arrangement is flat, and the peripheral portion 552 is oriented at an angle A relative to the flat central portion 550. In some embodiments, each of the peripheral portions 551, 552, 553 and 554 are arranged at an angle relative to the flat central portion 550. As shown in the side view of FIG. 16D, each of the peripheral portions 551, 552, 553 and 554 of the bottom side 516 of the gasket arrangement are oriented at an angle A relative to the flat central portion 550 in a direction extending toward the top side 518 of the gasket arrangement 500.

In the illustrative embodiment shown in FIG. 16B, each of the peripheral portions 551, 552, 553 and 554 comprises a protruding lobe extending outwardly from the flat central portion 550.

As discussed above, each of the peripheral gaskets may include one or more ribs 501. In some embodiments, a contact surface 611 of the ribs 501 may be bent out of plane such that the contact surface 611 includes a flat portion 613 and an angled portion 615 that extends at an angle relative to the flat portion (see FIG. 16C). In some embodiments, a contact surface 614 of a central rib 531 may be flat.

The angle A may be any suitable angle. In some embodiments, the angle A is at least about 10 degrees, at least about 11 degrees, at least about 12 degrees, at least about 13 degrees, at least about 14 degrees, at least about 15 degrees, at least about 16 degrees, at least about 17 degrees, at least about 18 degrees, at least about 19 degrees, at least about 20 degrees, at least about 21 degrees, at least about 22 degrees, at least about 23 degrees, at least about 24 degrees, at least about 25 degrees, at least about 26 degrees, at least about 27 degrees, at least about 28 degrees, at least about 29 degrees, or at least about 30 degrees. In some embodiments, the angle A is less than or equal to about 30 degrees, less than or equal to about 29 degrees, less than or equal to about 28 degrees, less than or equal to about 27 degrees, less than or equal to about 26 degrees, less than or equal to about 25 degrees, less than or equal to about 24 degrees, less than or equal to about 23 degrees, less than or equal to about 22 degrees, less than or equal to about 21 degrees, less than or equal to about 20 degrees, less than or equal to about 19 degrees, less than or equal to about 18 degrees, less than or equal to about 17 degrees, less than or equal to about 16 degrees, less than or equal to about 15 degrees, less than or equal to about 14 degrees, less than or equal to about 13 degrees, less than or equal to about 12 degrees, less than or equal to about 11 degrees, or less than or equal to about 10 degrees. It should be appreciated that combinations of the above-stated ranges are also possible. In some embodiments, the angle A is about 10 degrees to about 30 degrees, or about 11 degrees to about 28 degrees, or about 12 degrees to about 26 degrees, or about 13 degrees to about 24 degrees, or about 14 degrees to about 22 degrees, or about 15 degrees to about 22 degrees, or about 16 degrees to about 20 degrees.

It should be appreciated that a gasket arrangement may be integrally formed as a one-piece construction, or may be comprised of separate pieces that are later joined together, or separate pieces that remain separate. For example, in one embodiment, a gasket arrangement has a bottom side with a flat central portion and one or more peripheral portions that are oriented at an angle relative to the flat central portion, where each of the peripheral portions are separate pieces from the central portion. The separate pieces may be joined to the central portion, e.g. via adhesive, mechanical interlock, or other attachment arrangements, or the separate pieces may remain separate from the central portion (e.g. spaced from the central portion).

In some embodiments, a gasket arrangement may include a perimeter rib that extends along a perimeter of the gasket arrangement such that the perimeter rib surrounds each of the plurality of openings. In some embodiments, the perimeter rib may be made up of portions of ribs from each of the plurality of peripheral gaskets. As shown in FIG. 16B, the gasket arrangement may include a perimeter rib 502 that is made up of the outermost ribs of the first, second, third and fourth peripheral gaskets 541, 542, 543 and 544.

According to one aspect, a gasket arrangement may have a plurality of sealing zones. As shown in the illustrative embodiment of FIG. 16B, gasket arrangement 500 includes a central sealing zone 640 and four peripheral sealing zones 641, 642, 643 and 644, each sealing zone having an associated gasket. For example, central sealing zone 640 includes the central gasket 530, first peripheral sealing zone 641 includes first peripheral gasket 541, second peripheral sealing zone 642 includes second peripheral gasket 542, third peripheral sealing zone 643 includes third peripheral gasket 543, and fourth peripheral sealing zone 644 includes fourth peripheral gasket 544. The gasket arrangement may include rib walls 601, 602, 603 and 604 that help to isolate the sealing zones from one another. In some cases, the rib walls may help to prevent a leak from one sealing zone from entering another sealing zone.

In some embodiments, the central gasket 530 may include a rib 531 surrounding a central opening 504 of the gasket arrangement. The rib walls may extend from the rib 531 of the central gasket. In some embodiments, the rib walls may extend from a rib of the central gasket to the perimeter rib 502 to help to isolate the sealing zones from one another.

FIG. 17 shows another gasket arrangement 500 which also has circular ribs 501 around each corresponding opening 505 to receive a port 30, 41-44. However, in FIG. 17, the outermost rib 514 follows the contour of the gasket which has a trapezoidal shape having rounded corners.

According to one aspect, the beverage forming apparatus may implement different dispensing operations in which dispensing occurs through selectable subsets of the inlet ports based on the type of beverage cartridge that is being used with the beverage forming apparatus.

As discussed above, having the ability to selectively dispense from subsets of inlet ports may permit adjustability of various characteristics of the formed beverage. Examples of adjustable characteristics include, but are not limited to: beverage strength, beverage volume and carbonation level. The type of beverage cartridge can be characterized in different ways, such as by variety (also referred to as flavor), beverage category, and/or a specific brew variable. The following are illustrative, non-limiting examples of varieties/flavors. For coffee, examples of varieties/flavors include, but are not limited to: dark roast, light roast, medium roast, hazelnut flavored, caramel flavored, Italian roast, French roast, pumpkin spice, chai, and vanilla. For tea, examples of varieties/flavors include, but are not limited to: green, black, jasmine, white, oolong, earl grey and chamomile. For iced beverages, examples of varieties/flavors include, but are not limited to: sweet tea, lemonade, grape, raspberry, cranberry, apple, orange and pineapple.

Examples of beverage categories include, but are not limited to, cocoa, coffee, espresso, iced beverages, tea and carbonated beverages. Examples of specific brew variables include beverage temperature, beverage strength, beverage volume and carbonation level.

In one illustrative example, user A prefers beverage cartridge type X to have a strong beverage strength, and cartridge type Y to have a light beverage strength. If cartridge type X has been inserted into the beverage formation device, the beverage formation device performs a dispensing operation in which dispensing occurs through a first subset of the inlet ports. If cartridge type Y has been inserted into the beverage formation device, the beverage formation device performs a dispensing operation in which dispensing occurs through a second subset of the inlet ports. To form a stronger beverage for cartridge type X than for cartridge type Y, the number of inlet ports in the first subset of inlet ports may be greater than the inlet port(s) of the second subset of inlet ports, e.g. to increase flavor extraction. Alternatively or in addition, some or all of the inlet ports in the first subset of inlet ports may be at a different position than the inlet port(s) of the second subset of inlet ports.

The appropriate operational instructions associated with a beverage cartridge type may be set in different ways. In some embodiments, each beverage cartridge type may have a default, pre-programmed set of operational instructions. These default operational instructions may be stored in the beverage formation device itself, and/or may be stored at a remote server. A user may change these default settings. In some embodiments, different users may have different profiles in which users may save their preferred operational instructions associated with a beverage cartridge type. As such, even if multiple users are using the same beverage formation device, the beverage formation device may execute different operational instructions for the same beverage cartridge type, depending on which user is using the beverage formation device.

The identity of the user may be determined by the beverage formation device in various different ways. For example, a user may select his or her identity or other profile by inputting such information into a user interface on the beverage formation device, or on another device such as a mobile device. The mobile device may then send user identification information to the beverage formation device. In some embodiments, the beverage formation device may automatically determine the user's identity without requiring input from the user. For example, the beverage formation device may detect proximity of a user's belongings, such as the user's phone or other mobile device, or a cup or other vessel associated with the user.

In one illustrative example, user A likes beverage cartridge type X to have a strong beverage strength, whereas user B likes beverage cartridge type X to have a light beverage strength. If cartridge type X has been inserted into the beverage formation device and user A is using the beverage formation device, the beverage formation device performs a dispensing operation in which dispensing occurs through a first subset of the inlet ports. If cartridge type X has been inserted into the beverage formation device and user B is using the beverage formation device, the beverage formation device performs a dispensing operation in which dispensing occurs through a second subset of the inlet ports. To form a stronger beverage for user A than for user Y, the first subset of inlet ports may be greater than the second subset of inlet ports, e.g. to increase flavor extraction. Alternatively or in addition, some or all of the inlet ports in the first subset of inlet ports may be at a different position than the inlet port(s) of the second subset of inlet ports.

In some embodiments, the beverage formation device and/or a remote device or resource that cooperates with the beverage formation device may include a look-up table that associates operational instructions with each beverage cartridge type. These operational instructions may be changed by a user and/or by another party, such as a supplier of the beverage cartridges and/or the beverage formation devices.

The beverage cartridge type may be identified in various different ways. In some embodiments, the beverage formation device may have the ability to detect the beverage cartridge type, either on its own or in cooperation with other device(s) or resource(s). In some embodiments, a user specifies the beverage cartridge type to the beverage formation device. In some embodiments, another device communicates with the beverage formation device to inform the beverage formation device of the beverage cartridge type. In some embodiments, the beverage formation device does not determine the beverage cartridge type or receive information about what the beverage cartridge type is. Instead, another device or resource determines or receives information about the beverage cartridge type, determines an appropriate dispensing operation for that beverage cartridge type, and then commands the beverage formation device to implement a specific dispensing operation.

As discussed above, in some embodiments, the beverage formation device has the ability to detect the type of beverage cartridge that has been inserted into the brew chamber of the beverage formation device.

For example, in some embodiments, the beverage formation device may include a reader that can read at least a portion of the beverage cartridge to detect the beverage cartridge type. The reader may be configured to read machine readable data, human readable data, or both. For example, in some embodiments, the beverage cartridge may include indicia that identifies the beverage cartridge type. The indicia may be in a machine readable format or in a human readable format, or a combination of both. Examples of indicia that may be read by a reader include bar codes (e.g., a 2D or 3D barcode), RFID tags, inductive, magnetic, optical (e.g. text, graphics, color), or physical indicia, or other suitable indicia. Examples of readers include cameras, bar code scanners, RFID readers, NFC readers, magnetic readers, readers for detecting physical features, or other suitable readers.

Information obtained by the reader may be decoded by the beverage formation device itself and/or by a remote device or resource that cooperates with the beverage formation device. For example, the beverage formation device may send non-decoded data obtained by the reader to a remote server. The remote server may decode the data and send the decoded data and/or appropriate operational instructions associated with the beverage cartridge type back to the beverage formation device. In other embodiments, however, the beverage formation device may, on its own, be able to decode the information obtained by the reader in order to determine appropriate operational instructions.

The reader may be positioned at any suitable location on the beverage formation device for detecting the beverage cartridge type. In some embodiments, the reader is positioned in or near the brew chamber. The reader may automatically read the beverage cartridge as the cartridge is inserted into the brew chamber, while the brew chamber is in the process of being closed, and/or when the brew chamber is in the closed state.

In some embodiments, the reader may be located on a housing of the beverage formation device. A user may hold the cartridge up to the reader to be read prior to inserting the beverage cartridge into the brew chamber.

In some embodiments, the reader is a handheld device that is operatively connected to the beverage formation device, in a wired or wireless arrangement. A user may move the reader toward the beverage cartridge to read the beverage cartridge prior to inserting the beverage cartridge into the brew chamber.

In some embodiments, the reader may be a standalone device that may operate independently of the beverage formation device, such as a mobile device, e.g. a smartphone, tablet, PDA, laptop, smartwatch, smart eyewear, or other suitable device. The standalone device may send information to the beverage formation device relevant to detection of the type of beverage cartridge. The information may be an image of the beverage cartridge, an actual identification of the beverage cartridge type, or other data.

The information may be sent from the standalone device to the beverage formation device in a wired or wireless arrangement. Information may be sent directly or indirectly from the standalone device to the beverage formation device. For example, in some embodiments, the standalone device may communicate with the beverage formation device via Bluetooth, radio frequency, RFID, NFC, WI-FI, satellite, or by any other suitable arrangement. In some embodiments, the standalone device may send information to a server, and the server may send the same information or related information to the beverage formation device.

In one illustrative example in which the server sends related information rather than the same information received from the standalone device, the standalone device may acquire an image of the beverage cartridge, and send the image to the server. The server may decode the image to determine the beverage cartridge type. The server may then send the beverage cartridge type to the beverage formation device. In other embodiments, however, the server may simply relay the information received from the standalone device to the beverage formation device.

Figure 18:
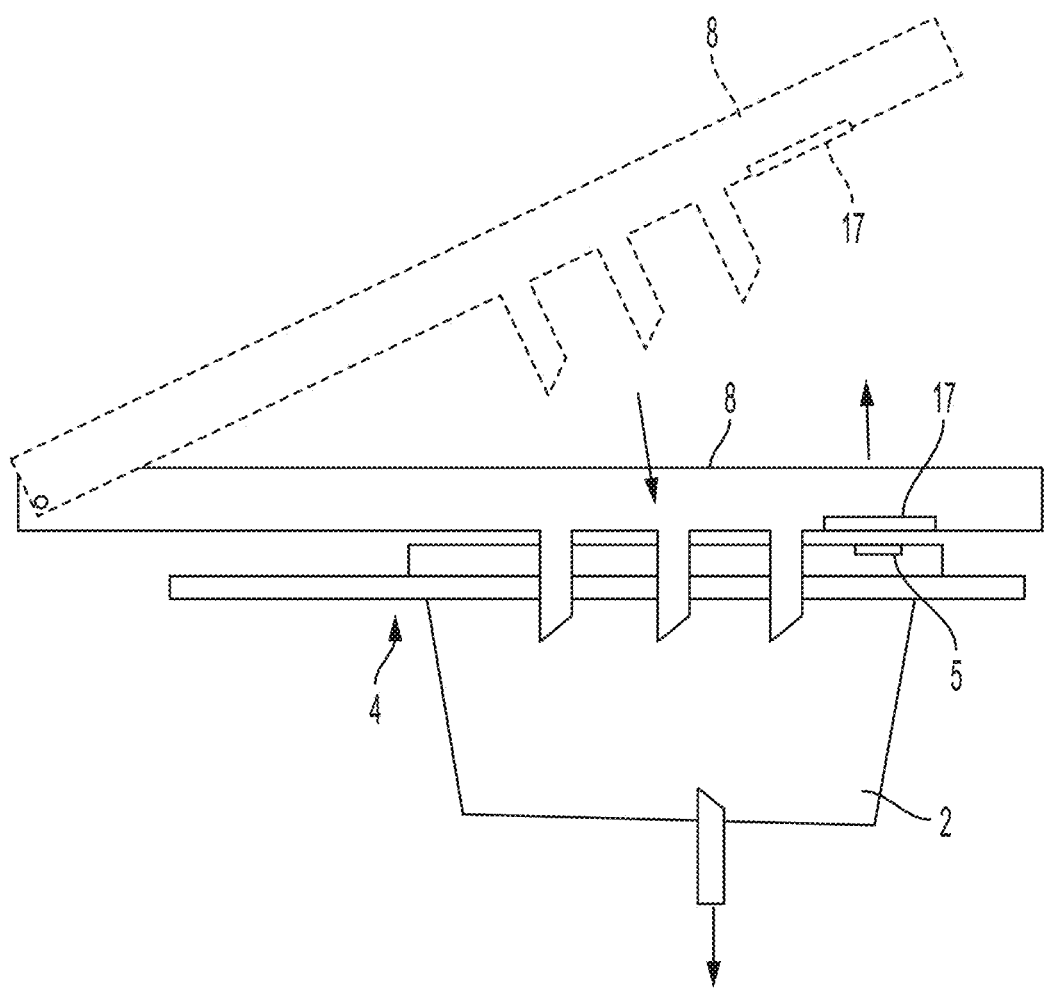
FIG. 18 is an illustrative embodiment of a beverage formation device having a brew chamber with a beverage cartridge reader.

One illustrative embodiment of a beverage cartridge reading arrangement is shown in FIG. 18. A reader 17 is positioned on the cover 8 of the brew chamber. The beverage cartridge 2 includes indicia 5 that is read by the reader 17 to determine the beverage cartridge type of the beverage cartridge 2.

Figure 19:
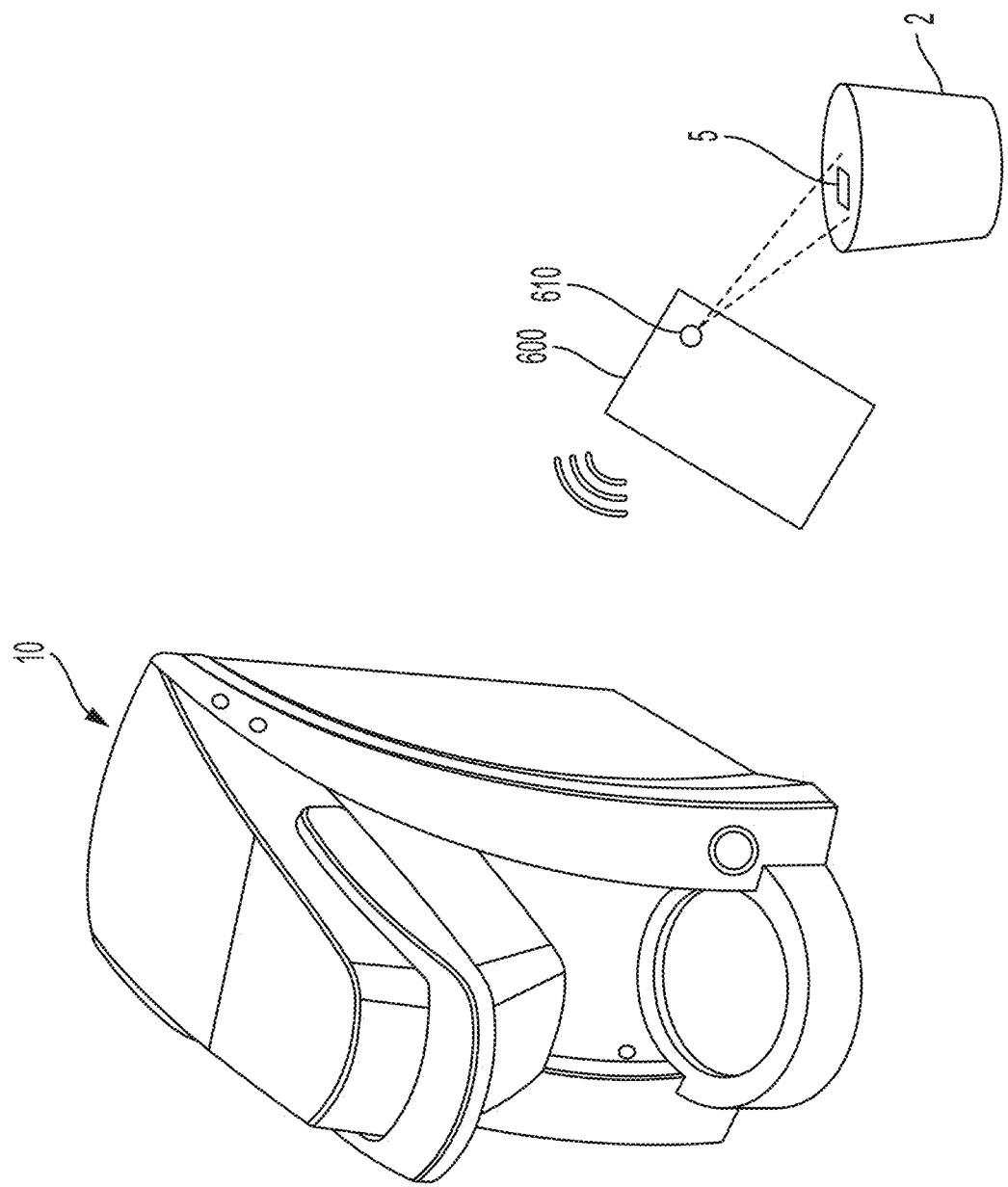
FIG. 19 is an illustrative embodiment of a beverage cartridge reading arrangement.

Another illustrative embodiment of a beverage cartridge reading arrangement is shown in FIG. 19. A reader in the form of a standalone mobile device 600 includes a camera 610 that reads indicia 5 on the beverage cartridge 2. The mobile device 600 then communicates information relating to the indicia to the beverage formation apparatus 10.

Figure 20:
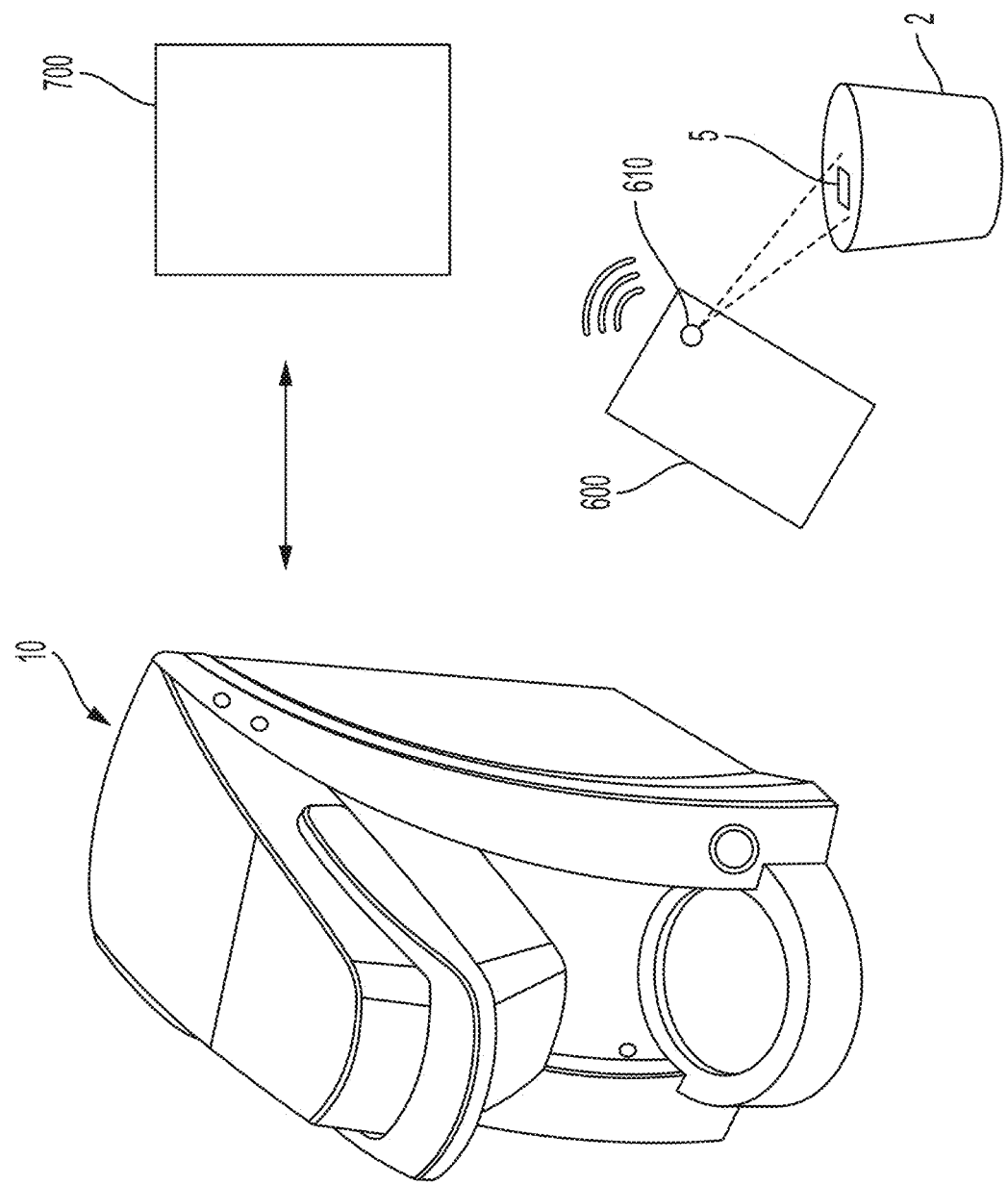
FIG. 20 is another illustrative embodiment of a beverage cartridge reading arrangement.

Another illustrative embodiment of a beverage cartridge reading arrangement is shown in FIG. 20. A mobile device 600 that includes a camera 610 reads indicia 5 on the beverage cartridge 2. The mobile device 600 then communicates information relating to the indicia to a remote server 700. The remote server 700 may then relay the same information or different but relevant information (such as operational instructions associated with the beverage cartridge type) to the beverage formation apparatus 10. Communication between the remote server 700 and the beverage formation apparatus 10 may be one-way or two-way. One or two-way communication between the beverage formation apparatus 10 and the mobile device 600 may also be possible.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A beverage forming system comprising:
   a brew chamber configured to hold a beverage cartridge containing a beverage ingredient, the brew chamber including a liquid inlet configured to provide liquid for combining with the beverage ingredient to form a beverage and a beverage outlet to allow beverage to exit the brew chamber, the liquid inlet comprising a plurality of inlet ports; and
   a gasket arrangement comprising a single unitary shape with a plurality of openings for receiving the plurality of inlet ports;
   wherein each of the plurality of inlet ports is received within one of the plurality of openings; and
   wherein the gasket arrangement comprises:
      one or more inner ribs disposed about each of the plurality of openings; and
      a perimeter rib that extends along a perimeter of the gasket arrangement such that the perimeter rib surrounds each of the plurality of openings.

2. The beverage forming system of claim 1 further comprising a plurality of rib walls that form a plurality of sealing zones that are distinct from one another, each of the sealing zones including a different one of the plurality of openings.

3. The beverage forming system of claim 1 wherein:
   the brew chamber comprises a brew chamber lid configured for opening and closing;
   the beverage cartridge comprises a beverage cartridge lid;
   the plurality of inlet ports includes at least one piercing element mounted to the brew chamber lid;
   closure of the brew chamber lid involves some lateral movement of the at least one piercing element with respect to the beverage cartridge lid;
   the lateral movement of the at least one piercing element causes tearing a portion of the beverage cartridge lid such that a hole is formed in the beverage cartridge lid, the hole being larger than a cross-sectional area of a respective one of the plurality of inlet ports; and
   the gasket arrangement is larger than the hole and helps to decrease leaking through the hole during brewing.

4. The beverage forming system of claim 3 wherein the brew chamber lid moves in an arc during closure.

* * * * *